Aug. 30, 1955 J. J. COLVIN 2,716,326
DOFFING AND DONNING APPARATUS
Filed May 12, 1951 13 Sheets-Sheet 1
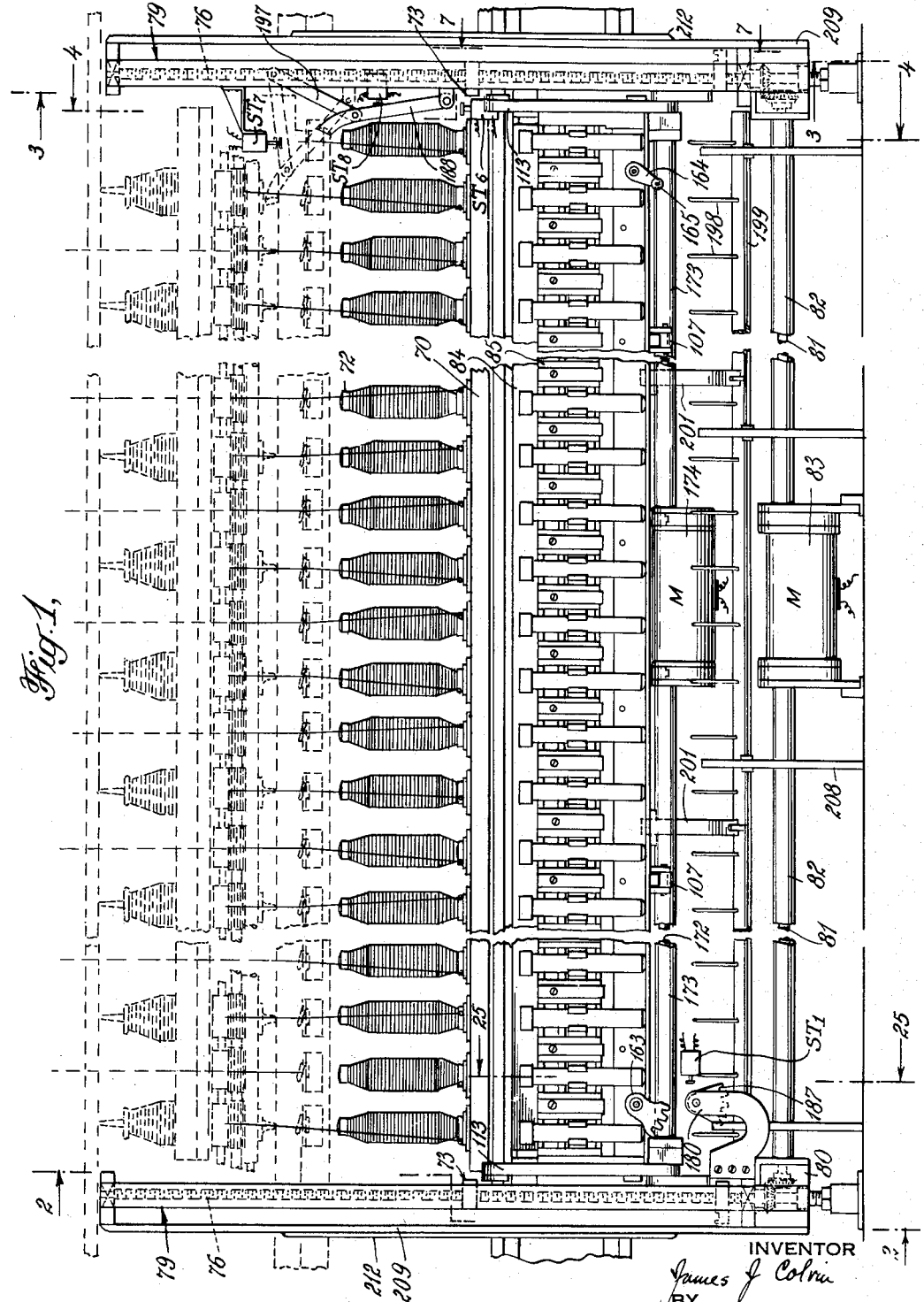
INVENTOR
James J. Colvin
BY
Pennie Edmonds Morton Burrows Taylor
ATTORNEYS Aug. 30, 1955
J. J. COLVIN
2,716,326
DOFFING AND DONNING APPARATUS
Filed May 12, 1951
13 Sheets-Sheet 2
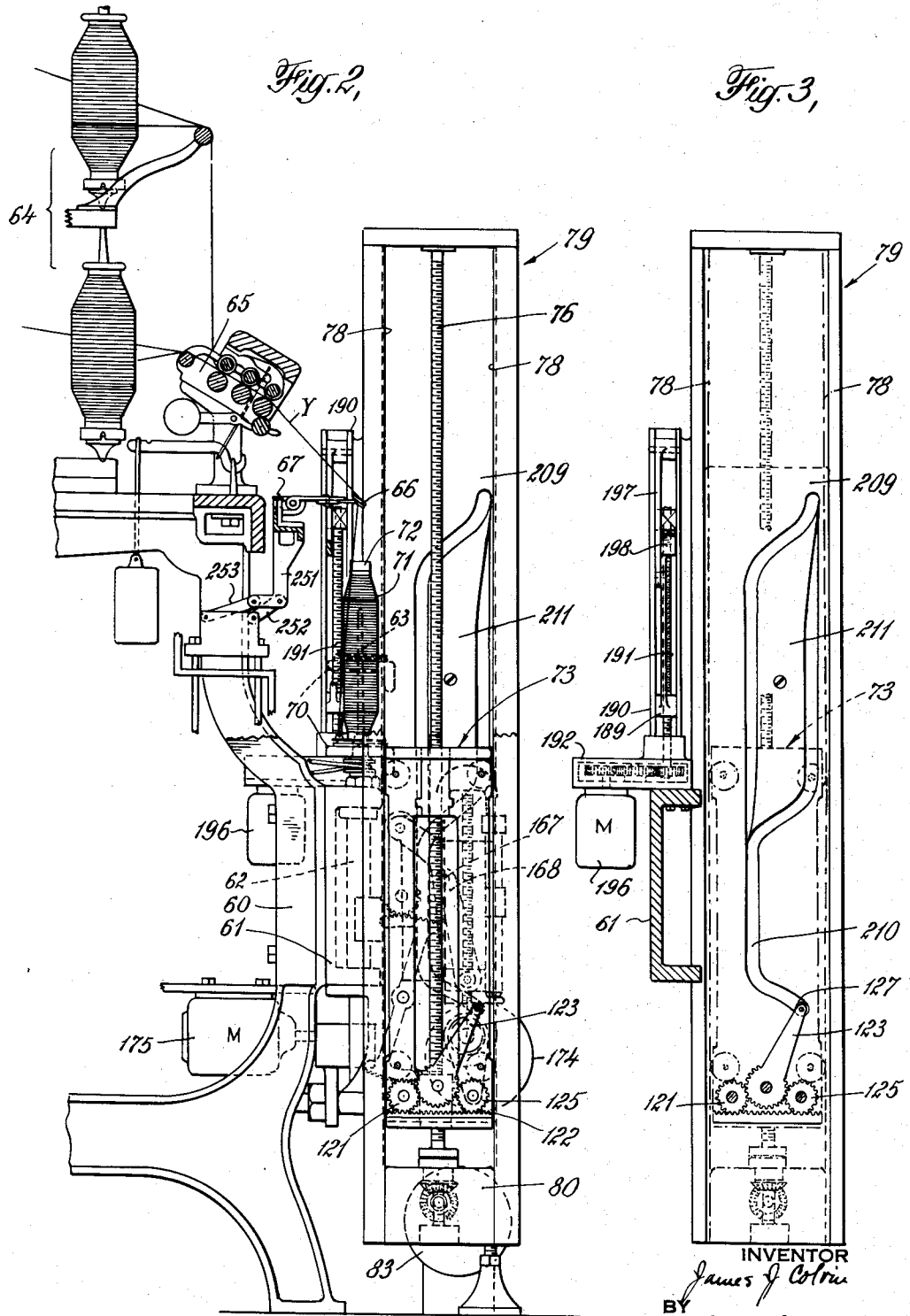
INVENTOR
James J. Colvin
BY
Pennie Edmonds, Morton, Barrows, Taylor
ATTORNEYS Aug. 30, 1955         J. J. COLVIN         2,716,326
            DOFFING AND DONNING APPARATUS
Filed May 12, 1951                    13 Sheets-Sheet 3
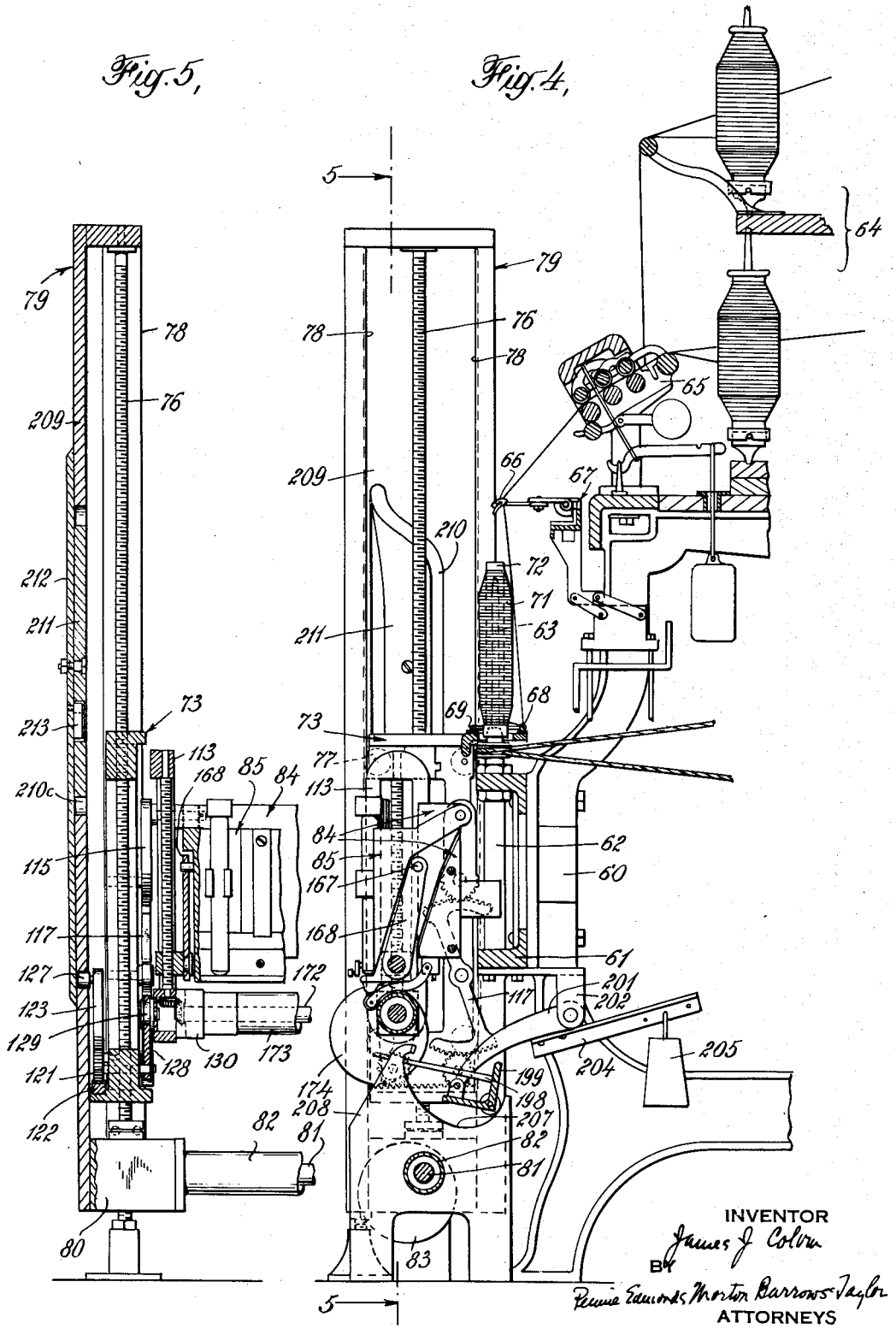

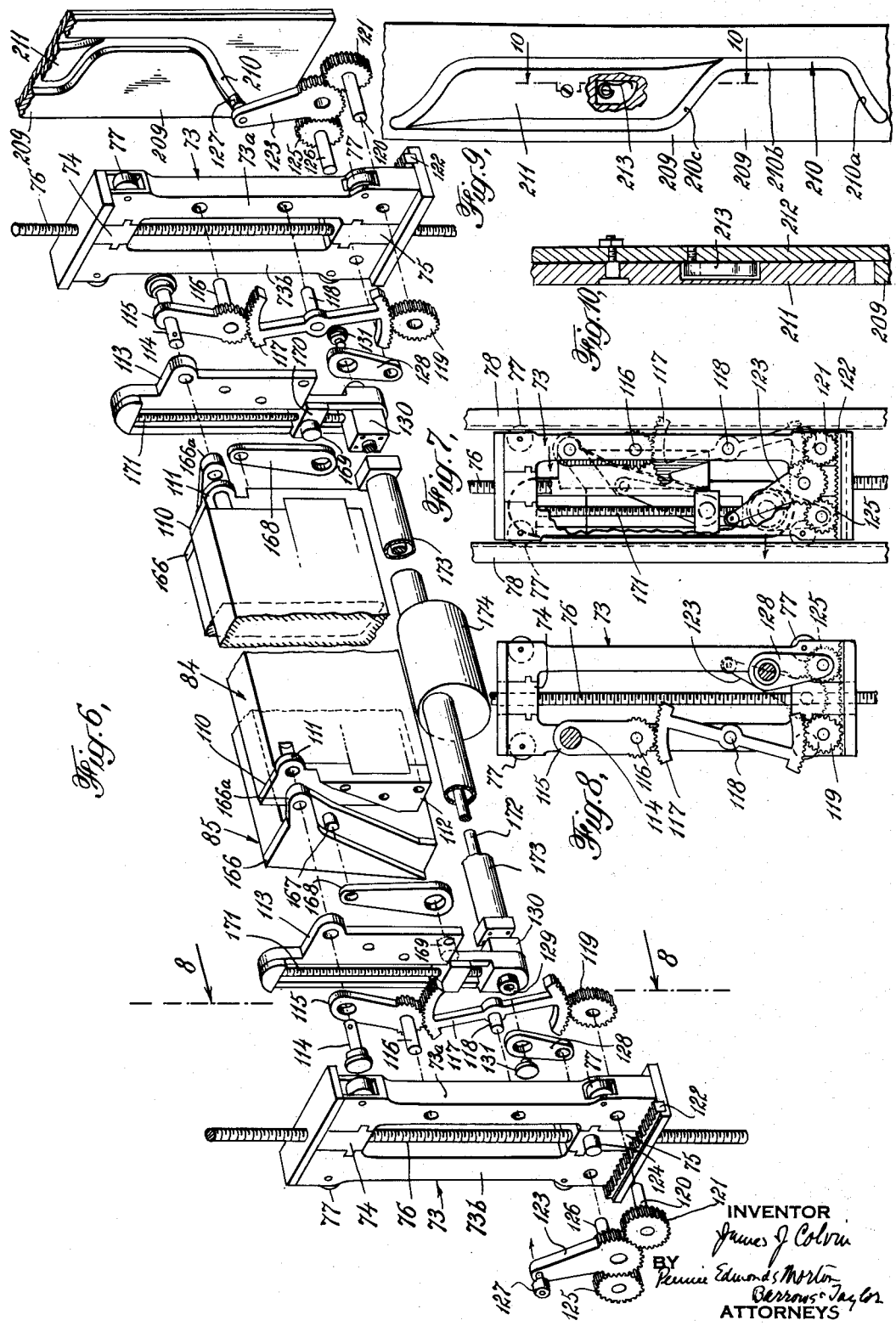

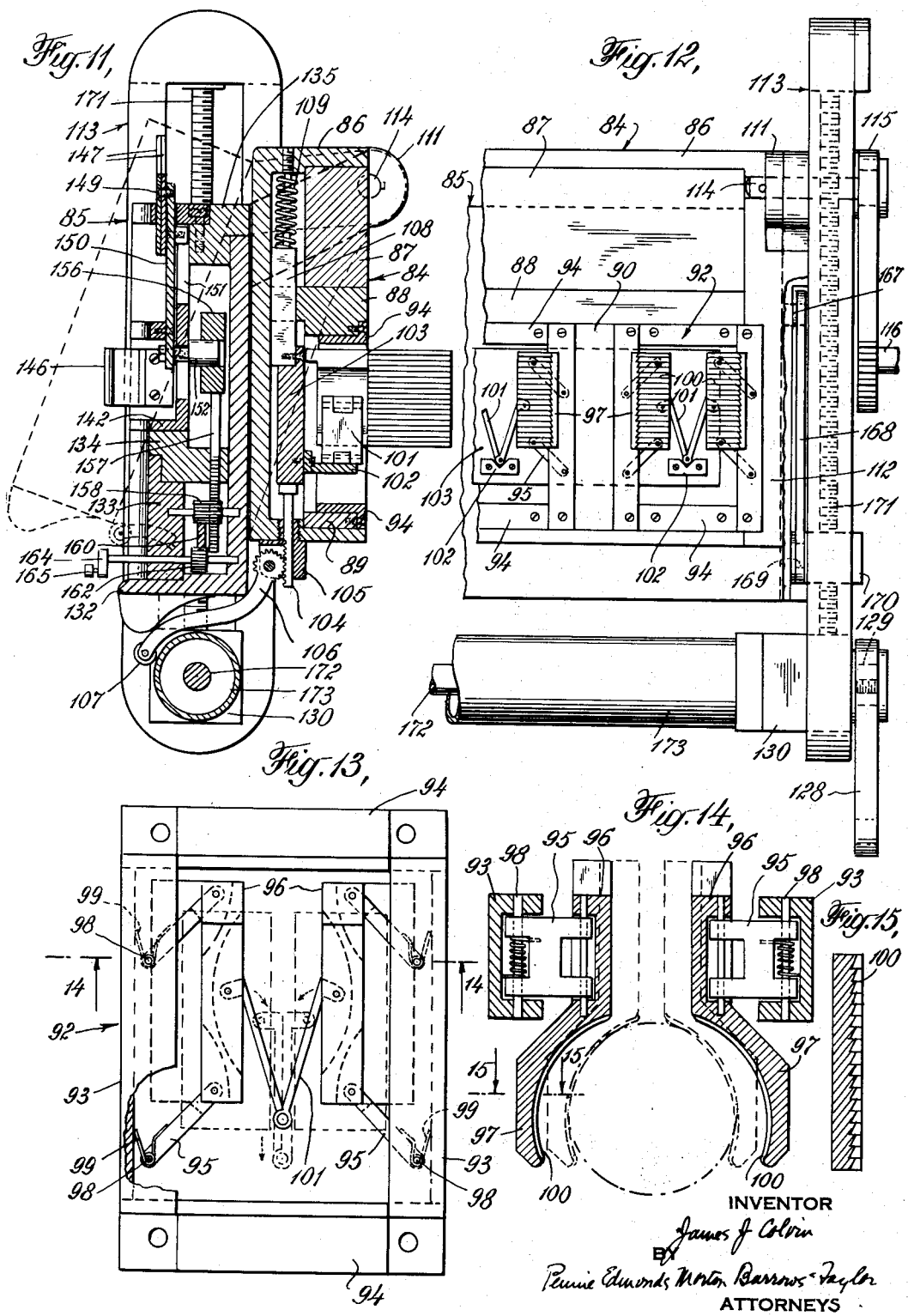

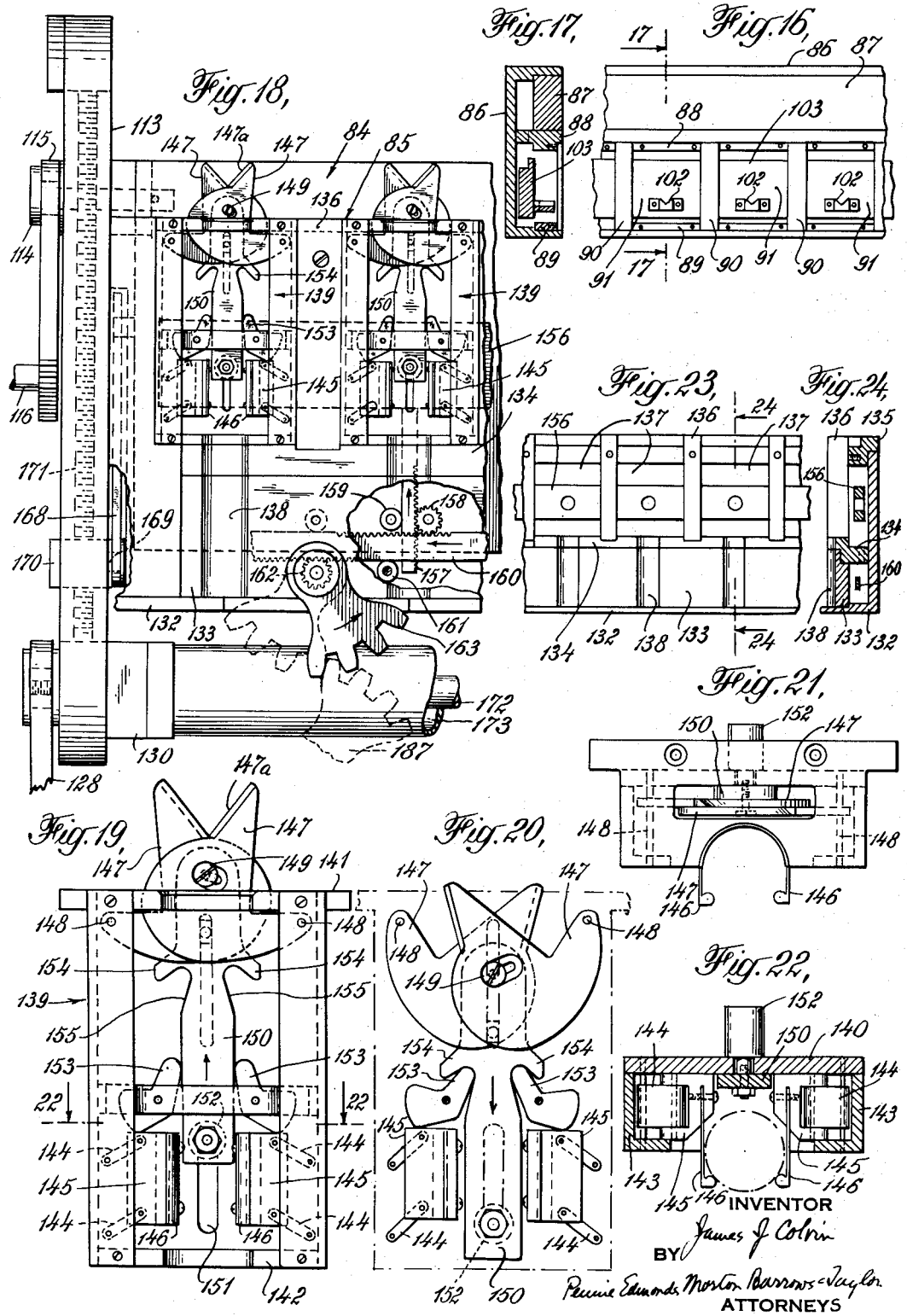

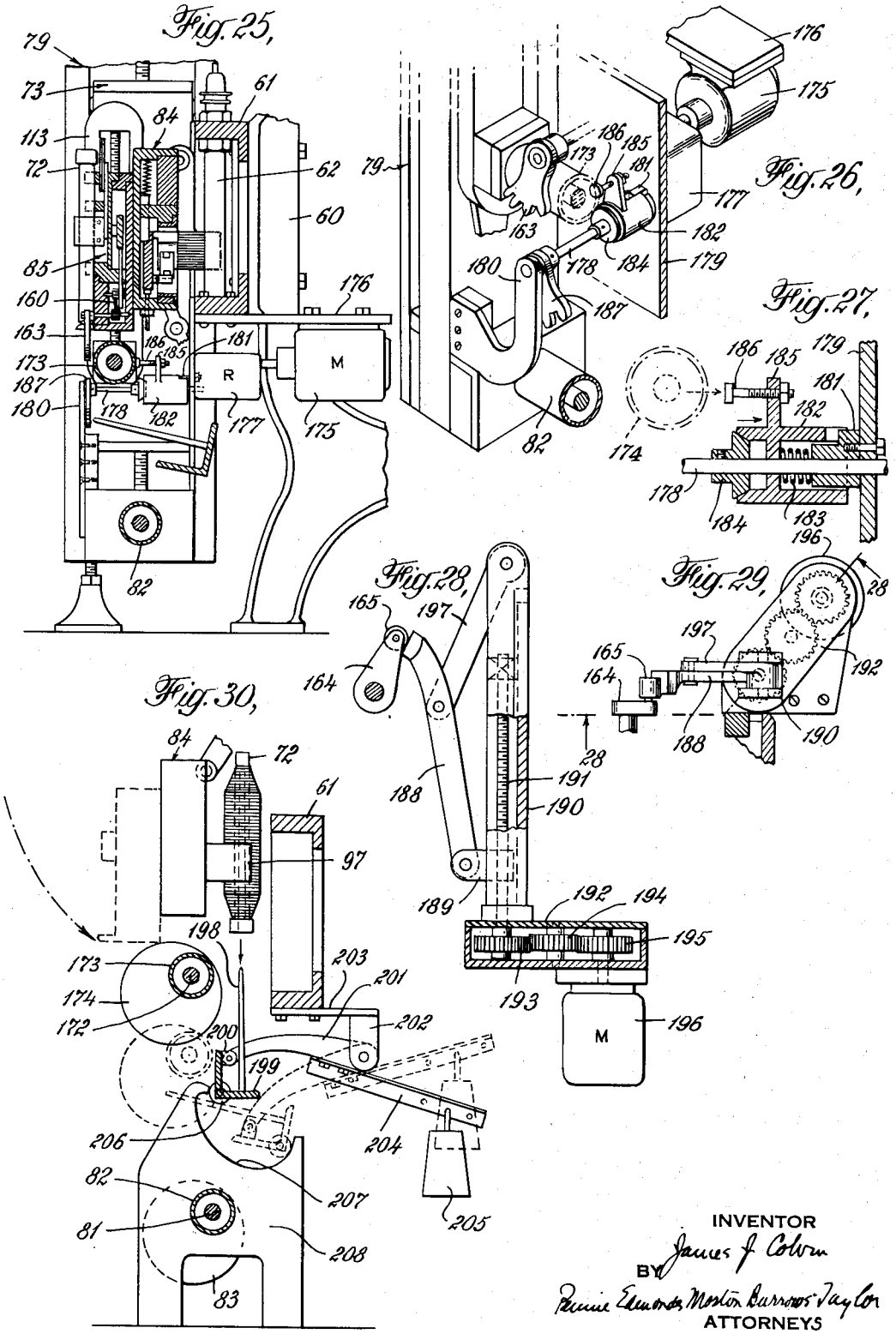

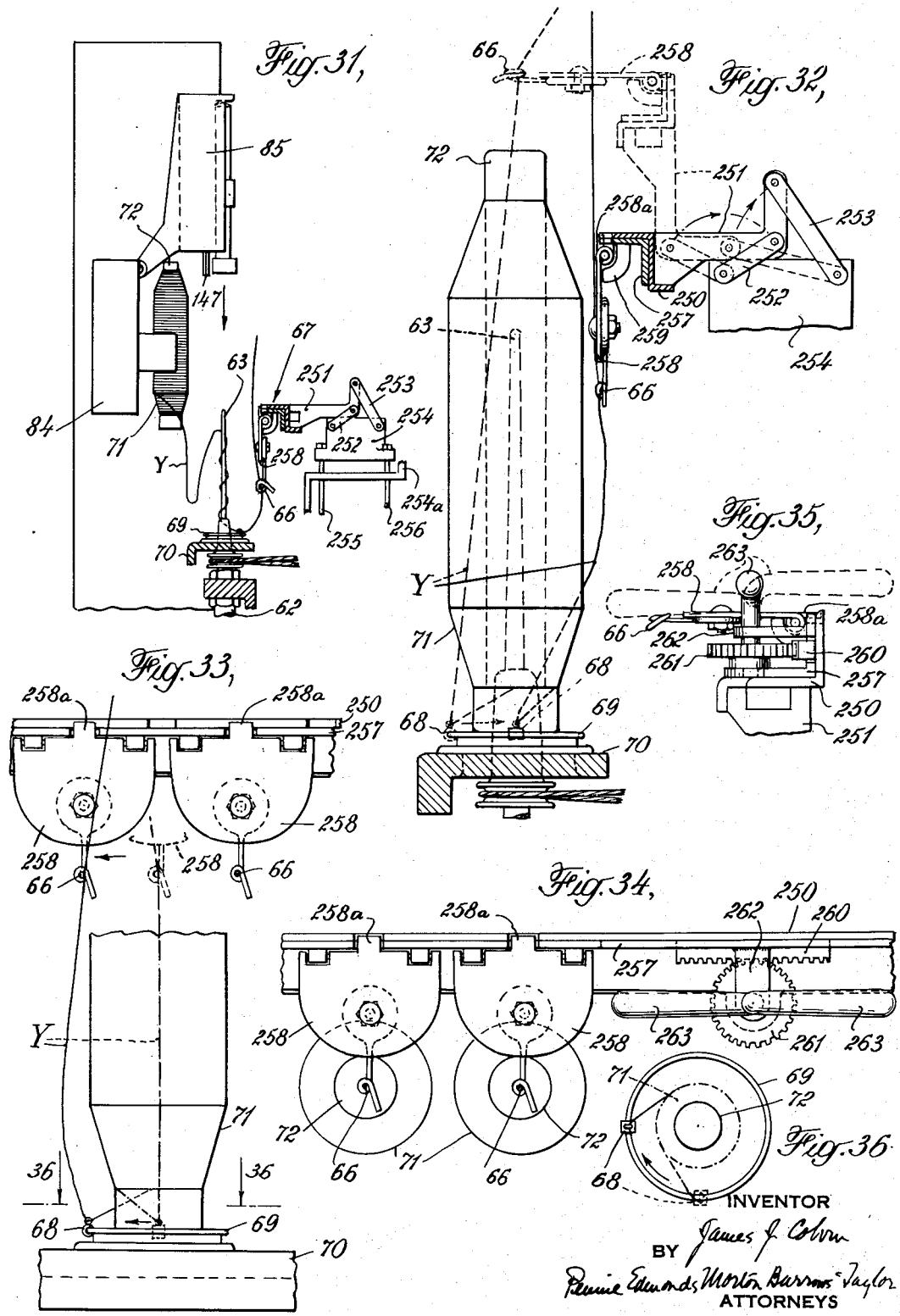

Aug. 30, 1955 J. J. COLVIN 2,716,326
DOFFING AND DONNING APPARATUS
Filed May 12, 1951 13 Sheets-Sheet 9
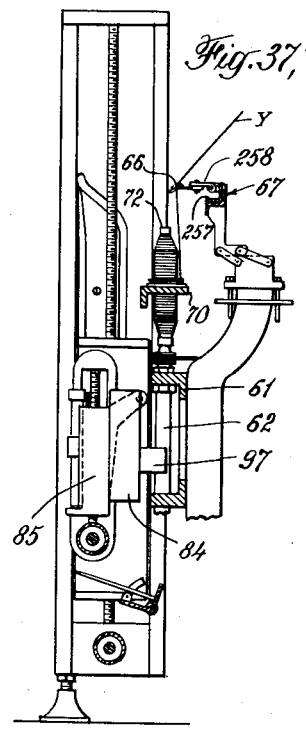
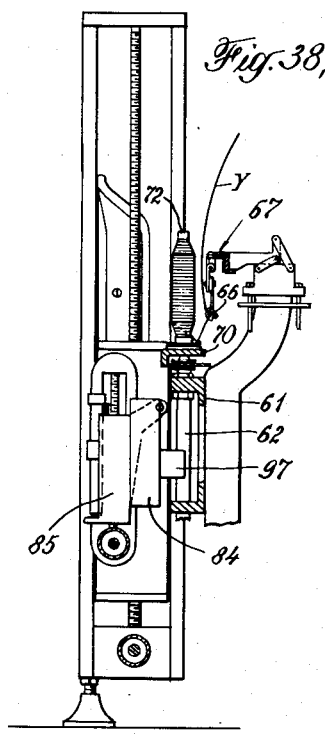
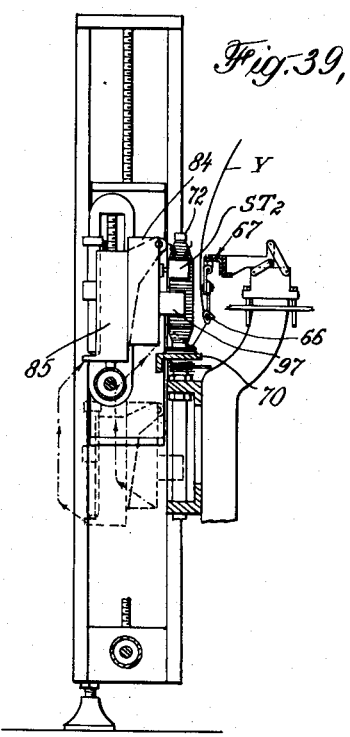
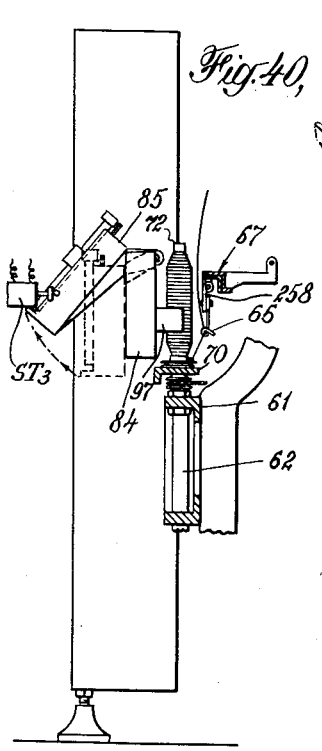
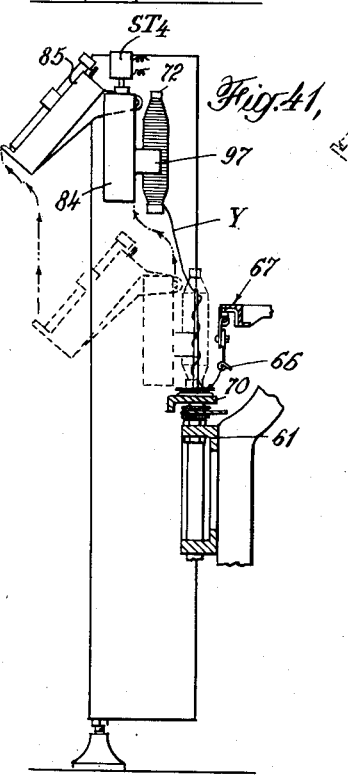
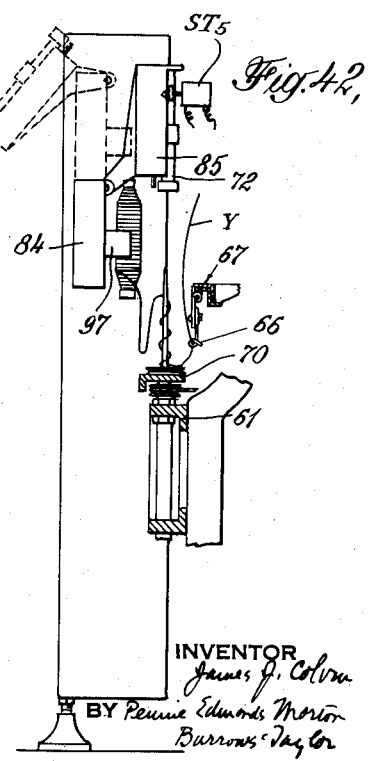
INVENTOR
James J. Colvin
BY Pennie Edmonds Morton
Burrows Taylor
ATTORNEYS Aug. 30, 1955  J. J. COLVIN  2,716,326
DOFFING AND DONNING APPARATUS
Filed May 12, 1951  13 Sheets-Sheet 10
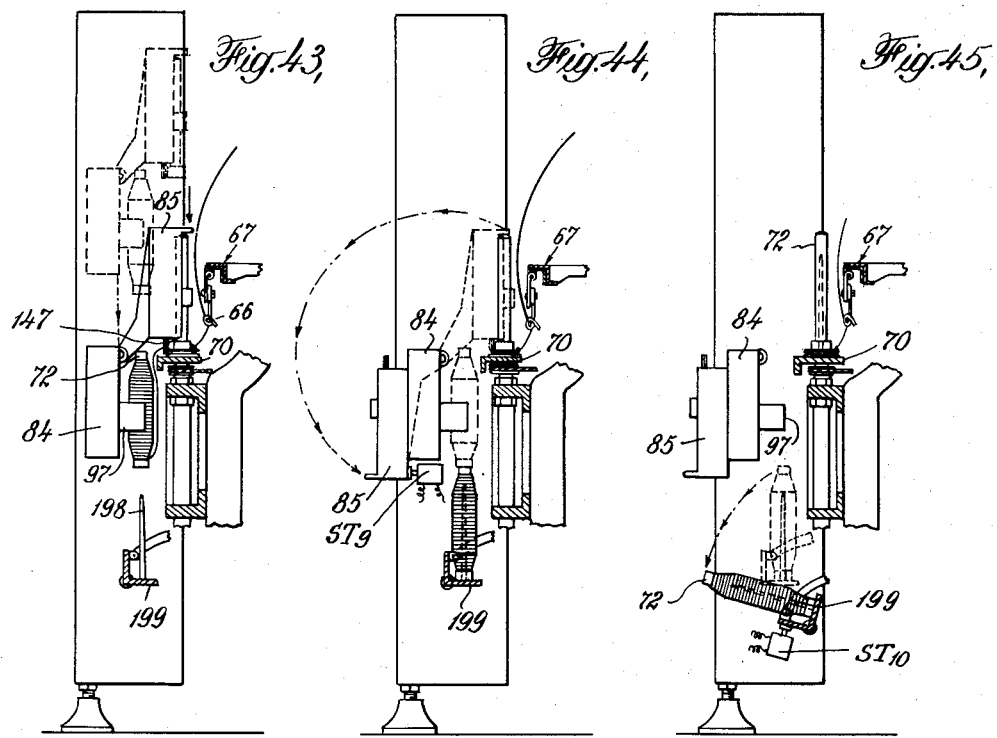
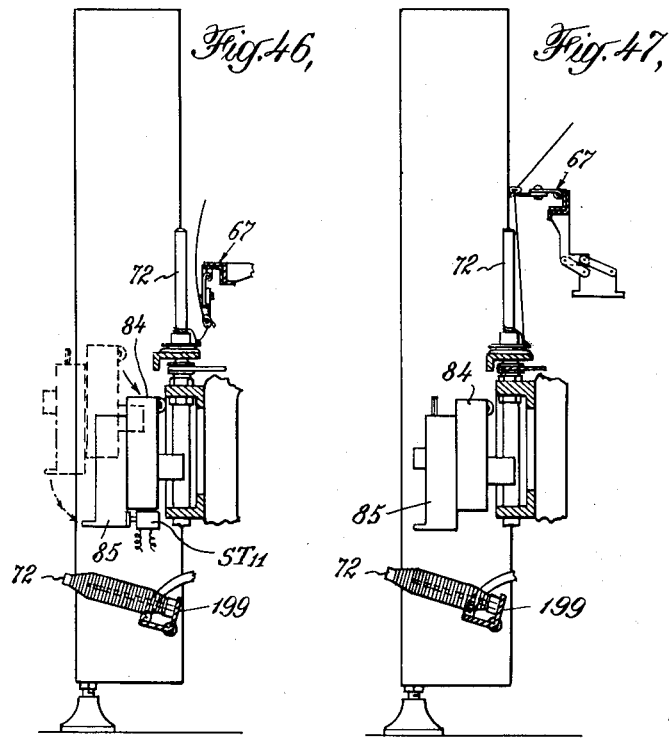
INVENTOR
James J. Colvin
BY
ATTORNEYS Aug. 30, 1955　　　　J. J. COLVIN　　　　2,716,326
DOFFING AND DONNING APPARATUS
Filed May 12, 1951　　　　　　　　　　　　　　13 Sheets-Sheet 11
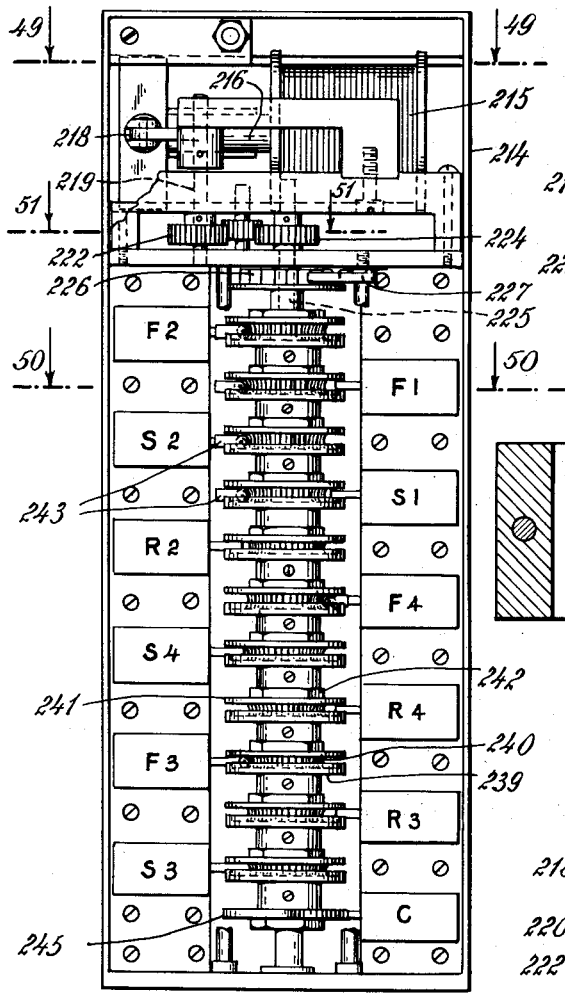
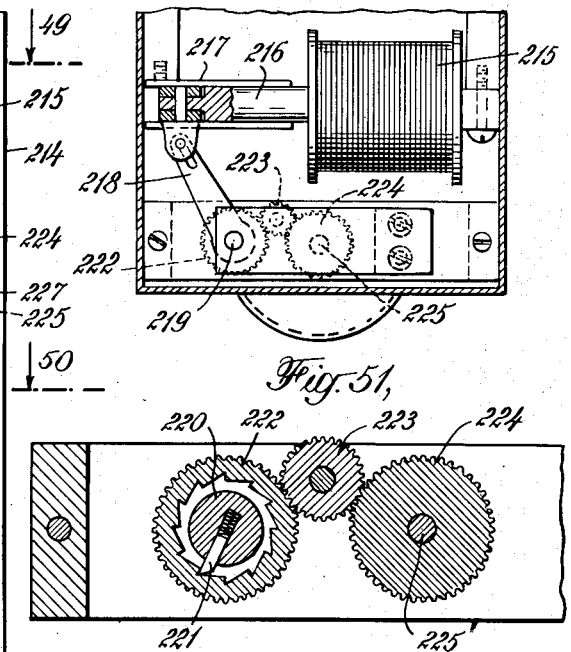
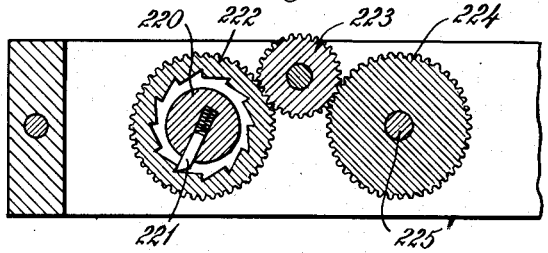
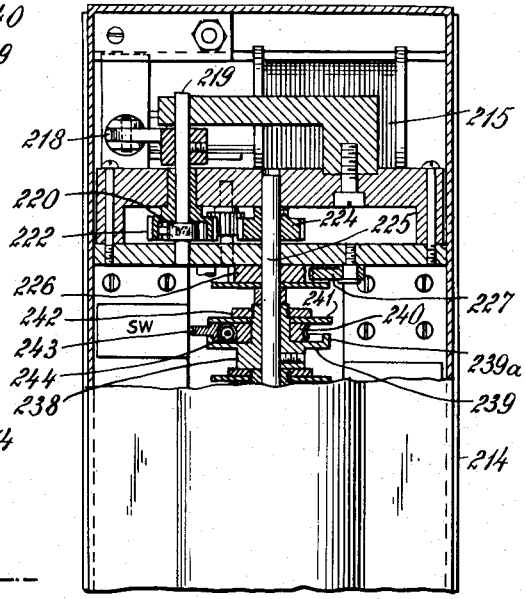
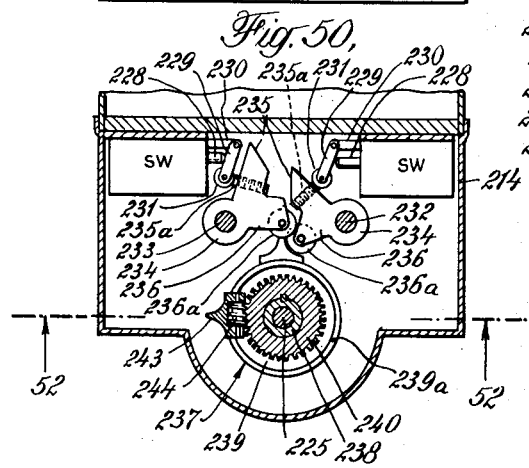
INVENTOR
James J. Colvin
BY
Pennie Edmonds Morton Burrows Taylor
ATTORNEYS

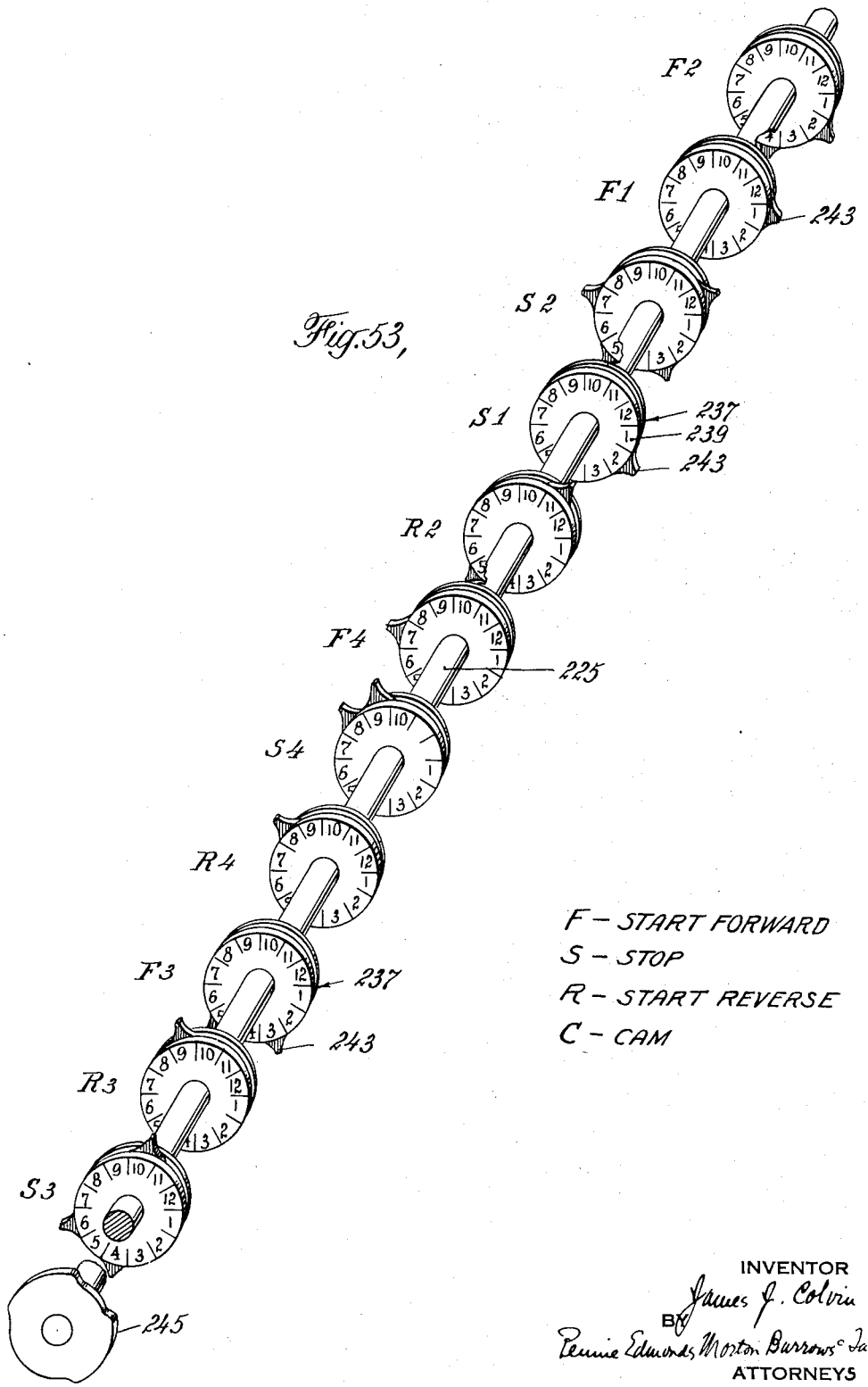

Aug. 30, 1955
J. J. COLVIN
2,716,326
DOFFING AND DONNING APPARATUS
Filed May 12, 1951
13 Sheets-Sheet 13
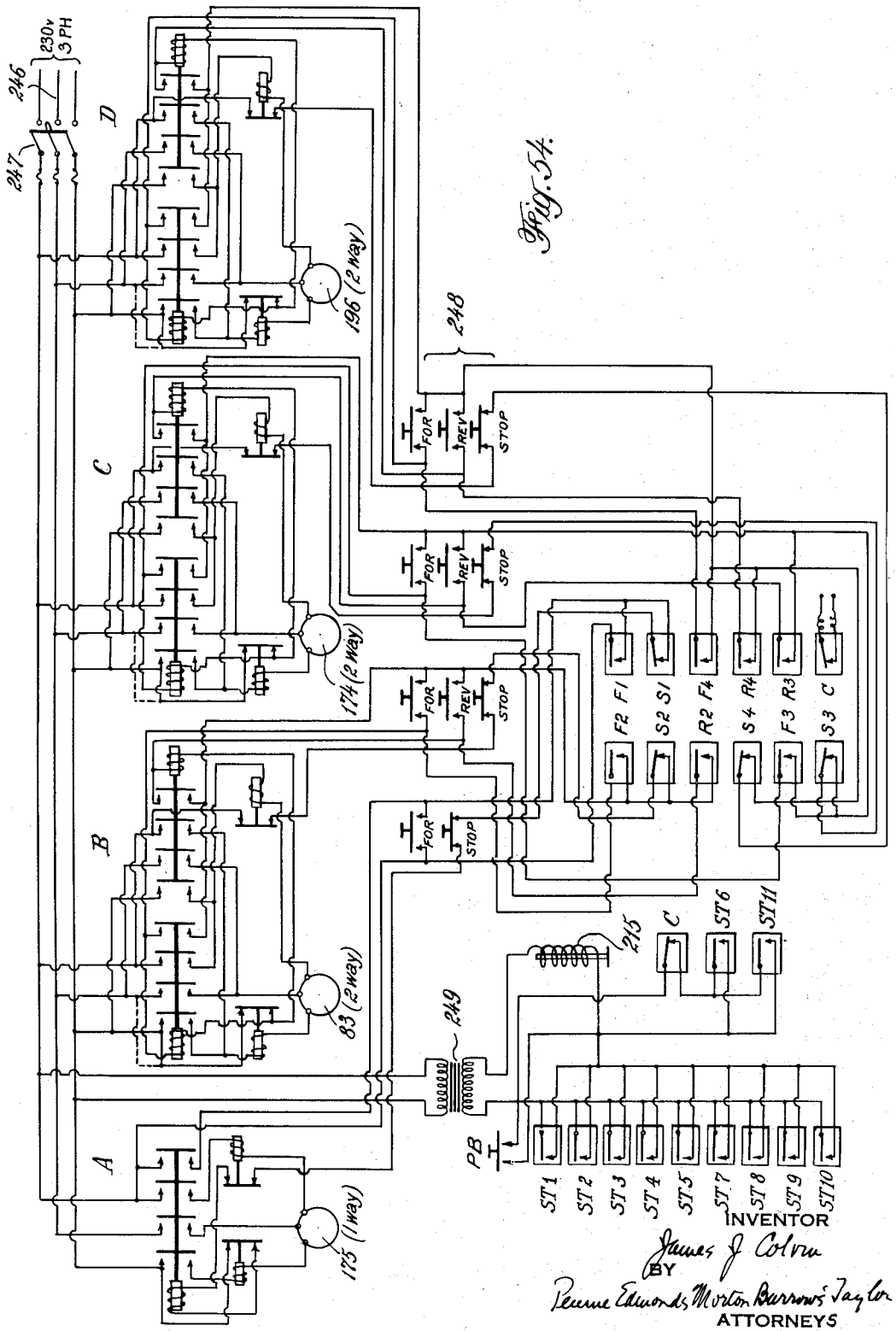

United States Patent Office 2,716,326
Patented Aug. 30, 1955

2,716,326

DOFFING AND DONNING APPARATUS

James J. Colvin, La Grange, Ga., assignor to Callaway Mills Company, La Grange, Ga., a corporation of Georgia Application May 12, 1951, Serial No. 225,955

17 Claims. (Cl. 57—52)

This invention relates to the doffing and donning of textile machines having spindles, on which cores, such as bobbins, cops, etc., are mounted for rotation, so that yarn may be wound thereon. More particularly, the invention is concerned with a novel method of performing donning and doffing operations and apparatus, which may be used advantageously in the practice of the method by an operator not possessing a high degree of manual dexterity. The method and apparatus of the invention may be utilized in doffing and donning textile machines of various kinds, such as ring spinning frames, quillers, twisters, etc., and, since ring spinning frames are typical of such machines, the use of the method in connection with such frames and a form of the apparatus suitable for the practice of the method with those frames will be illustrated and described in detail for purposes of explanation.

Heretofore, the operation of doffing and donning the bobbins of ring spinning frames have commonly been performed by hand and, since the frames are idle during the periods when those operations are going on, it is important that the doffer be highly skilled and able to work rapidly and efficiently in order that the inevitable loss of production will be kept as low as possible. As skilled doffers are not always available, the desirability of developing an aparatus, by which doffing and donning can be carried on by an unskilled operative, has long been recognized, and numerous attempts have been made to devise such apparatus. However, either because of the complexity of the proposed apparatus or for other reasons, the previous efforts to solve the problem of providing an acceptable apparatus have met with little or no commercial success and, so far as I am aware, no doffing and donning equipment has been employed to any considerable extent in commercial operations in this country up to the present.

In carrying out the method of the invention on a ring spinning frame, the operative stops the frame, when the bobbins are full, and then lowers the ring rail to the lower ends of the bobbins and spins a few coils of yarn, called "doffing coils," on the lower ends of the bobbins. He then shifts the yarns between the delivery rolls and the travelers in such direction as to move each traveler rearwardly, that is, in a direction opposite to that of its normal travel, so that the travelers lie at one side of their rings. Thereafter, by the use of the doffing and donning features of the apparatus, the full bobbins are gripped, doffed from their spindles, and moved forwardly. The empty bobbins are now moved to vertical positions above and in alignment with their spindles and donned thereon. The forward movement of the full bobbins causes the yarn from each bobbin to extend forwardly from its doffing coils and, when the donning of the empty bobbins is completed and these bobbins are released, the yarns are cut between their full bobbins and their doffing coils. The full bobbins are then discharged.

The portion of the apparatus of the invention, by which the doffing and donning operations are carried on, is started manually and operates thereafter automatically to perform a cycle of operations, during which the full bobbins are removed from the spindles, empty bobbins are mounted on the spindles, the yarns are cut between each full bobbin and the spindle, from which it was removed, and the full bobbins are discharged. The apparatus is preferably constructed to operate simultaneously on all the spindles on a side of a ring spinning frame or like textile machine and the apparatus is mounted permanently adjacent the frame with the spindle rail of the frame serving as the basic structural member of the apparatus.

The apparatus includes a carriage extending the full length of the row of spindles and comprising a pair of beams, one of which is mounted for translational movement only, that is, movement without rotation, both vertically and also horizontally in a direction transverse to the row of spindles. This beam is provided with means for gripping the full bobbins on the spindles, so that they can be doffed by the movement of the beam, and may, for convenience, be referred to as the "doffing beam." The second beam is mounted pivotally on the carriage for translational movement with the doffing beam and also for swinging movement on a horizontal axis and the second beam, which may be referred to as the "donning beam," carries means for holding empty bobbins to be mounted on the spindles and means for cutting the yarns between the full bobbins and the spindles, after the full bobbins have been doffed.

The carriage is mounted for vertical reciprocating movement in guides at the ends of the spinning frame and, when it is not functioning, it is stored in a down position, in which it lies with its beams below the top of the upper flange of the spindle rail and with the doffing beam lying close to the plane of the row of spindles and the donning beam at the lower end of its arc of travel and outside and in contact with the outer face of the doffing beam. In this position of the donning beam, its bobbin holding means are exposed, so that empty bobbins may be inserted therein, while the spinning frame is operating. When the bobbins on the spindles are full and doffing is required, the first steps of the method are performed, after which the apparatus is started manually and carries out its cycle of operations. When the cycle has been completed, the full bobbins have been doffed, the donning of the empty bobbins has been completed, the full bobbins have been discharged, and the carriage is in its stored position with the beams in the positions above described. The apparatus then remains stored throughout the operation of the spinning frame, until the next doff is required.

For a better understanding of the invention, reference may be made to the accompanying drawings, in which:

Fig. 1 is a view in front elevation of a ring spinning frame equipped with a form of the new doffing and donning apparatus for use in the practice of the method of the invention;

Figs. 2, 3, and 4 are vertical sectional views on the lines 2—2, 3—3, and 4—4, respectively, of Fig. 1;

Fig. 5 is a vertical sectional view on the line 5—5 of Fig. 4;

Fig. 6 is an exploded rear perspective view, with parts removed, of the carriage of the apparatus;

Fig. 7 is a sectional view with parts broken away on the line 7—7 of Fig. 1;

Fig. 8 is a sectional view on the line 8—8 of Fig. 6;

Fig. 9 is an elevational view of one of the positioning plates;

Fig. 10 is a view on the line 10—10 of Fig. 9;

Fig. 11 is a vertical sectional view through the beams of the carriage;

Fig. 12 is a fragmentary rear elevational view of a portion of the carriage;

Fig. 13 is a front elevational view of one of the full bobbin gripping units on the doffing beam;

Fig. 14 is a sectional view on the line 14—14 of Fig. 13;

Fig. 15 is a sectional view on the line 15—15 of Fig. 14;

Fig. 16 is a fragmentary rear elevational view of the doffing beam with the full bobbin gripping units removed;

Fig. 17 is a sectional view on the line 17—17 of Fig. 16;

Fig. 18 is a front elevational view of a portion of the carriage, showing details of the donning beam with the parting shears in projected position;

Fig. 19 is a front elevational view of a single unit of the donning beam with the shears projected;

Fig. 20 is a fragmentary front elevational view, showing the mode of operation of the parting shears and of the holding means for empty bobbins on the donning beam;

Fig. 21 is a plan view of one unit of the donning beam;

Fig. 22 is a sectional view on the line 22—22 of Fig. 19;

Fig. 23 is a fragmentary front elevational view of the donning beam with the holding means and shears removed;

Fig. 24 is a sectional view on the line 24—24 of Fig. 23;

Fig. 25 is a sectional view on the line 25—25 of Fig. 1;

Fig. 26 is a perspective view showing the driving means for priming the empty bobbin holding means and parting shears on the donning beam;

Fig. 27 is a longitudinal sectional view of the brake mechanism of the driving means of Fig. 26;

Fig. 28 is a view, partly in elevation and partly in section, on the line 28—28 of Fig. 29, showing the means for releasing the empty bobbin holding means and operating the parting shears of the donning beam;

Fig. 29 is a plan view of the releasing and operating means of Fig. 28;

Fig. 30 is a simplified vertical sectional view through the apparatus, showing the construction of the full bobbin receiving means;

Fig. 31 is a simplified vertical sectional view showing the relative positions of the beams, the ring rail, and the thread board, when the donning operation is about to start;

Fig. 32 is a simplified vertical sectional view showing the manner, in which the thread board is moved to shift the yarns and their travelers;

Fig. 33 is a front elevational view of the structure of Fig. 32 showing the effect of moving the thread board endwise;

Fig. 34 is a plan view of the thread board in its normal position;

Fig. 35 is an end view showing the means for moving the thread board endwise;

Fig. 36 is a plan view showing the movement of a traveler about its ring as a result of downward movement of the thread board after it has been moved endwise;

Figs. 37—47, inclusive, are simplified vertical sectional views showing the steps in the practice of the method by the apparatus;

Fig. 48 is a front elevational view, with parts broken away, of the control unit for the apparatus;

Figs. 49, 50, and 51 are sectional views on the lines 49—49, 50—50, and 51—51 of Fig. 48;

Fig. 52 is a sectional view on the line 52—52 of Fig. 50;

Fig. 53 is a view in perspective of the cam shaft of the control unit; and

Fig. 54 is a wiring diagram of the control mechanism.

The apparatus illustrated in the drawings is constructed for doffing and donning all the spindles on one side of a ring spinning frame, of which only such parts are illustrated as are required for an understanding of the operation of the apparatus. The frame (Fig. 2) includes the usual sampsons 60 supporting a spindle rail 61, in the upper and lower flanges of which are mounted the bolsters 62 of the spindles 63 (Fig. 31). The roving is supplied from bobbins in a creel 64 and passes therefrom to the usual rolls in a roll stand 65. From the rolls, the individual yarns Y pass through respective pig-tail thread guides 66 mounted on the thread board 67 and then through travelers 68 (Fig. 33) on respective rings 69 carried by the ring rail 70. During the operation of the frame, the ring rail reciprocates vertically to build the masses 71 of yarn on the bobbins 72 mounted on the spindles.

The apparatus of the invention includes a carriage (Fig. 6) made up of a pair of elevating trucks 73, each of which has the form of an open center frame provided with a nut 74 and a guide sleeve 75 at its upper and lower ends, respectively. An elevating screw 76 extends through the sleeve, the frame, and the nut and the rotation of the screws causes the trucks to be moved vertically. Each truck is provided with rollers 77, projecting laterally and engaging members 78 (Figs. 3, 5) attached to a frame 79 secured to the flanges of the spindle rail at each end thereof. The upper end of each elevating screw 76 is received in a bearing in the top member of a frame 79 and the lower end of the screw is supported and guided in a radial-thrust bearing at the top of a gear box 80. Within the gear box, the screw is connected through gearing to a shaft 81 contained within a tube 82. Shafts 81 are driven by a motor 83, which is of the reversing type and is thus capable of driving the shafts 81 and the elevating screws in unison in both directions to raise and lower the carriage. In addition to the elevating trucks, the carriage comprises a doffing beam 84 and a donning beam 85.

*The doffing beam*

The doffing beam 84 (Figs. 11–17, inc.) comprises a channel member 86, within which are mounted filler bars 87, 88, and 89 extending the full length of the member. Vertical bars 90 are mounted in spaced relation along the channel and extend from its lower flange to filler bar 88. The bars 88 and 89 form the top and bottom of a series of cells 91 having sides formed by adjacent vertical bars 90. The cells are equal in number to the number of spindles on the spinning frame and are disposed with their vertical median lines opposite respective spindles.

Each cell 91 contains a demountable full core gripping unit 92, which consists of a frame made up of side channel sections 93 connected at top and bottom by crossbars 94 secured, respectively, to the filler bars 88 and 89. A pair of toggle links 95 are pivoted between the flanges of each channel member 93 and the shank 96 of a gripping jaw 97 is pivotally attached to the inner ends of each pair of links. The pivot pins 98, by which the links are connected to their channel members, are surrounded by springs 99 tending to swing the jaws downwardly to gripping position. Each jaw 97 extends outwardly beyond the rear faces of the channel members 94 and the jaws of a pair have opposed concave surfaces with saw-tooth grooving 100. When the jaws are moved downwardly, the grooved surfaces approach each other and the jaws are thus able to grasp a full bobbin between them.

The jaws of each pair are spread apart by a pair of links 101 pivoted together at their lower ends and having their upper ends pivotally attached to adjacent jaws. The lower connected ends of each pair of links 101 are seated in a recess in a block 102 attached to an actuating bar 103 which extends lengthwise of channel member 86 behind the cells 93. Plungers 104 attached to the actuating bar extend downwardly therefrom through bushings 105 threaded into openings in the lower flange of channel member 86. Near its lower end, each plunger 104 is formed with rack teeth engaging the teeth of a gear segment on a lever 106 pivoted in a slot in the bushing 105 for the plunger and having a roller 107 at its outer end. A plurality of guide bars 108 secured to the actuating bar 103 extend upwardly along the inner face of the web of channel member 86 through respective openings in filler bar 88 and each guide bar 108 is acted on by a spring 109 engaging the top flange of the channel and the upper end of the guide bar. Springs 109 urge actuating bar 103 downwardly, so that links 101 may move down and springs 99 may close jaws 97.

Each end of the doffing beam 84 is provided with an end plate 110 (Fig. 6) having an ear 111 extending to the rear toward the spinning frame and, on its front face, each plate is provided with an integral block 112 having its front surface cut away at an angle. A chassis frame 113 is rigidly secured to the outer face of each block 112 and a headed pivot pin 114 extends through an opening in the frame and through the ear 111 of the adjacent end member 110 of the beam. An upper positioning lever 115 loosely encircles a collar on each pivot pin 114 adjacent the head of the pin and lies between the head of the pin and the outer face of the chassis frame 113, through which the pin passes. The lever is rigidly attached to a pivot pin 116 rotatable in an opening in the rear vertical side member 73a of the adjacent elevating truck 73. Lever 115 is provided at its lower end with a gear segment meshing with a gear segment on the upper end of an intermediate lever 117 fast on a pivot pin 118 rotatable in an opening in truck frame member 73a. At its lower end, lever 117 has a gear segment meshing with a gear 119 on a shaft 120 extending through an opening in truck side member 73a and carrying a gear 121 on its outer end beyond the frame member. Gear 121 meshes with a rack bar 122 movable lengthwise in a groove in a flange projecting outwardly from the lower end of truck 73 and gear 121 also meshes with a gear segment on a lever 123 mounted for rotation on a pivot 124 attached to the guide sleeve 75 at the lower end of the truck. The gear segment at the lower end of lever 123 meshes with a gear 125 on a shaft 126 projecting through an opening in the front side frame member 73b of the truck 73, and gear 125 also meshes with the rack bar 122. The rack bar serves to provide a better interlock between gears 121 and 125 and reduce the load strain on their teeth in mesh with the teeth of the gear segment on lever 123. Lever 123 has a roller 127 mounted for free rotation on a pin projecting outwardly from the free end of the lever and shaft 126 is rigidly secured to the lower end of a lower positioning lever 128. The upper end of the lower positioning lever 128 encircles a boss 129 on the end of a gear box 130 attached to the lower end of the adjacent chassis frame 113, the lever being held on the boss by a headed screw 131.

With the construction described, the chassis frame 113 (Fig. 6) attached to each end of the doffing beam is supported by the upper ends of a pair of upper and lower positioning levers 115, 128 mounted at their lower ends on shafts 116, 126, respectively, carried by the vertical side members of an elevating truck 73. When the levers 123, lying outside the trucks, are rocked, the pairs of positioning levers 115, 128 are swung in unison and effect a translational movement of the doffing beam 84 in a direction determined by the direction of angular movement of levers 123. As each lever 123 is swung on its pivot 124, its engagement with its gear 121 causes the meshing gear 119 to swing the related intermediate lever 117 and rock the upper positioning lever 115. Rocking of lever 123 also causes angular movement of gear 125, which in turn causes corresponding movement of the lower positioning lever 128.

The donning beam

The donning beam (Figs. 11 and 18–24, inclusive) comprises an L-section member 132, a bottom longitudinal filler bar 133 resting on the bottom flange of member 132, an intermediate longitudinal filler bar 134 attached to the face of the member above the bottom flange, and a top longitudinal filler bar 135. A plurality of spaced vertical bars 136 extend upward from bar 134 and overlie and are secured to bar 135, the bars 136 forming the sides of a plurality of cells 137, each centered opposite one of the spindles of the spinning frame. The front faces of bars 133 and 134 are grooved to form a channel 138 leading downward from each cell.

Each cell 137 contains a demountable empty bobbin-gripping unit 139, which is provided with a pair of gripping jaws for holding an empty bobbin and a pair of parting shears. Each gripping unit 139 includes a housing consisting of a back plate 140, end plates 141, 142, and side angle members 143 rigidly secured to the end members 141, 142. A pair of upper and lower toggle links 144 are pivotally mounted on pins secured to the back plate and the overhanging flange of each side member of a unit and the free ends of each pair of links are pivotally connected to a block 145, to which is attached a holding jaw 146 of spring material having an inwardly curled outer end. The free ends of the holding jaws project out of the housing of the unit between the opposed edges of the flanges of the side members 143.

A pair of shearing members 147 having opposed cutting edges 147a are pivoted within the housing of each empty core unit on pins 148 extending between the back plate 140 and the flanges of the side angles 143 near one end of the housing of the unit. The members 147 are connected by a screw 149 to one end of a slide 150 lying within the housing and carrying a pin extending outwardly through a vertical slot 151 in the back plate 140 of the housing, the pin carrying a cap 152 on its end outside the back plate. The edges of the slide are engageable by cams 153 pivoted on the inner surface of back plate 140 and having portions engaging the upper ends of blocks 145 carrying holding jaws 146. Near its upper end, the slide is provided with a pair of ears 154 and, beneath the ears, the sides of the slide are cut away, as indicated at 155. When the slide is in the projected position shown in Fig. 19, the sides of the slide have forced the upper ends of cams 153 to swing outwardly and this has caused blocks 145 to move downwardly on their toggle links 144, so that jaws 146 approach each other. When the slide moves to the inner position shown in Fig. 20, the ends of the cams are moved inwardly against the cut-away portions 155 of the sides of the slide and the blocks 145 and the jaws carried thereby are free to move away from each other. As the slide moves in, the shearing members swing on their pivots in such manner as to effect a shear cut.

The movement of the slides 150 to project their shears and cause the pairs of empty bobbin holding jaws to move to holding position is effected by an actuating bar 156 extending the full length of the angle member 132 behind the empty bobbin holding units and having openings receiving the caps 152 secured to the several slides 150. A plurality of vertical guide bars 157 rigidly attached to bar 156 extend downwardly therefrom and through openings in the filler bar 134, and each guide bar is provided near its free end with rack teeth meshing with a gear 158 (Fig. 18) on a stub shaft received in openings in the vertical web of angle member 132 and filler bar 133. The guide bar is held in mesh with the gear by a roll 159 on a stub shaft also received in openings in the vertical flange of angle 132 and filler bar 133. Each of the gears 158 also meshes with rack teeth on the top of a bar 160 extending lengthwise of the channel member 132 and running on rollers 161 on stub shafts received in openings in the vertical web of angle 132 and filler bar 133. Near each end, bar 160 is formed on its under surface with rack teeth meshing with pinions 162 on shafts extending through filler bar 133. The shaft of pinion 162 at one end of the bar 160 is provided with a lever 163 having a gear segment at its outer end. At the other end of the bar, the shaft of pinion 162 is provided with a lever 164 (Fig. 1) carrying a roller 165 on a pin at the free end of the lever.

At each end (Fig. 6), the donning beam has an end plate 166 provided with a rear extension 166a having a sloping rear edge. Each extension has a thickness such that it may fit freely between the end plate 110 at one end of the doffing beam and the adjacent chassis frame 113 and the extension has an opening near its free end, through which pivot pin 114 may pass. The extension 166a on each end plate 166 has a projecting pin 167 entering an opening in one end of link 168 and the other end of the link 168 is mounted on a boss 169 on a nut 170. Each nut 170 has a portion entering a vertical slot in the adjacent chassis frame 113 and a screw 171 passes through the nut and has its upper end received in an opening in the top bar of the frame. The lower end of the screw enters gear box 130 attached to the chassis frame and, within the gear box, the screw is connected to a shaft 172 within a tube 173. The tubes are connected to the casing of a motor 174 driving shafts 172 in unison, and the motor is of the reversing type, so that it can drive the screws 171 to raise and lower nuts 172. The pins 167 are offset forwardly from a vertical plane through the pivot pins 114 and, when the screws 171 are rotated to raise nuts 170, the donning beam swings outwardly away from the doffing beam and may be moved through an arc of about 180°. After such movement, the donning beam lies offset inwardly from the doffing beam and is inverted.

When the donning beam is in its lowered stored position at the completion of a cycle of operations, the parting shears 147 of each empty bobbin unit are in the retracted position shown in Fig. 20 and the holding jaws 146 of the unit are open. In the first step in the cycle of operations, the parting shears are to be projected to the position shown in Fig. 19, and the holding jaws are to be closed. For this purpose, the actuating bar 160 in the donning beam is given an initial movement to the left to the position shown in Fig. 18. This movement of the bar is effected by means of a priming unit (Figs. 25–27).

The priming unit includes a motor 175 attached to a plate 176 secured to the lower flange of the spindle rail. The shaft of the motor enters a gear reduction box 177, the output shaft 178 of which passes through a plate 179 attached to the adjacent end frame 79 and is supported at its outer end in a bracket 180 attached to the frame. The shaft 178 passes loosely through a collar 181 secured to plate 179 and extends through a sleeve 182, which is telescoped over collar 181 and is keyed thereto against rotation. Sleeve 182 is urged away from collar 181 by a spring 183 toward a collar 184 fast on shaft 178, the collar and the end of sleeve 182 having coned engaging surfaces acting as a brake. Collar 182 has a lug 185 carrying a bolt 186 engageable by the casing of motor 174 carried by the donning beam. When the donning beam is in stored position, the engagement of the casing of motor 174 with bolt 186 forces lug 185 away from collar 184 and compresses spring 183, so that the brake is ineffective.

Shaft 178 carries a gear segment 187 engageable with the gear segment 163 (Fig. 18) rigidly secured to pinion 162 meshing with rack teeth on the actuating bar 160. When the motor 175 is rotated, it causes a clockwise movement of gear segment 187 and, when this gear segment engages the gear segment on lever 163, it moves the latter counterclockwise through an arc and pinion 162 moves the actuating bar 160 to the left to the position shown in Fig. 18. In such movement, the guide rods 157 attached to bar 156 are raised and this causes the slides 150 of all the parting shears to be moved upwardly to the projected position shown in Figs. 18, 19. The upward movement of the slides causes cams 153 to act on blocks 145 and move the empty bobbin holding jaws 146 to holding position.

After the empty bobbins carried by the donning beam have been mounted on the spindles at a later step in the cycle, the holding jaws must release the bobbins and the parting shears must be actuated to cut each yarn between its spindle and the full bobbin doffed therefrom. The release of the donned empty bobbins and the actuation of the parting shears are effected by moving the bar 160 to its initial position. For this purpose, the arm 164 fast on the end pinion shaft at the right hand end of the donning beam (Fig. 1) is moved to rotate its pinion and thereby move bar 160 to the right (Fig. 18). At this stage in the operations, the donning beam has been inverted and lies behind the doffing beam. The arm 164, accordingly, lies at the rear of the donning beam in position to have its roller 165 engaged by the end of an operating arm 188 (Fig. 28) pivotally attached at its lower end to a nut 189 mounted for vertical movement within a guide frame 190 attached to the right-hand end frame 79 (Fig. 1). A screw 191 extends through the nut and is journalled at its upper end in a bearing in the frame. At its lower end, the screw enters a gear box 192, within which the end of the screw carries gear 193 meshing with gear 194 which, in turn, meshes with gear 195 on the shaft of a motor 196 of the reversing type. A toggle link 197 attached to the upper part of the frame 190 is pivotally connected to the operating arm 188 near its free end. On rotation of screw 191 in one direction by motor 196, nut 189 moves upwardly and this causes the free end of operating arm 188 to rock lever 164 through an arc. The pinion, on the shaft of which lever 164 is mounted, then acts on the rack teeth on bar 160 to move the bar to the right (Fig. 18) and this causes the guide rods 157 to move bar 156 and slides 150 down. Such movement of the slides causes the parting shears to cut and the empty bobbin holding jaws to release the bobbins held thereby.

*The full bobbin receiver*

When the full bobbins have been doffed and the carriage is returning to stored position with the full bobbins held in place by the jaws 97 on the doffing beam 84, the jaws are opened to release the full bobbins and these bobbins drop down and are telescoped over the spindles of a full bobbin receiver. The release of the full bobbin gripping jaws is effected by engagement of a portion of the donning beam 85 with the rollers 107 on the ends of levers 106, when the donning beam is moving to its lower position against the outer face of the doffing beam (Fig. 11). As the free ends of levers 106 are moved down by the donning beam, the gear segments on the levers raise plungers 104 and thereby raise the actuating bar 103. The upward movement of the bar causes the full bobbin gripping jaws to open.

The full bobbins released by the opening of the gripping jaws 97 drop down to telescope over spindles 198 (Fig. 30) attached to one flange of an angle iron 199 extending the length of the spinning frame, the spindles 198 being aligned with respective spinning spindles. The other flange of the angle iron carries lugs 200 pivotally attached to arms 201 pivoted on brackets 202 attached to a plate 203 secured to the lower flange of the spindle rail 61. Arms 201 have rearward extensions 204 carrying weights 205 and angle iron 199 is provided with rollers 206 movable along guide surfaces 207 on plates 208 rising from the floor and having openings for shafts 81 and their enclosing tubes 82. When the full bobbins are dropped down over spindles 198, their weight overcomes the weights 205 and arms 201 swing downward. The contour of guide surfaces 207 is such that, as rollers 206 move along them, the angle iron 199 swings on its pivotal connections with arms 201, until the spindles assume the dotted line positions shown in Fig. 30. When the spindles 198 are in this position, they do not interfere with the return of the doffing and donning beams 84, 85 to stored position and the full bobbins may be removed from spindles 198, while the spinning frame is operated.

The movements of the doffing and donning beams

During a cycle of operations, the carriage comprising the elevating trucks, the doffing and donning beams, etc., is reciprocated vertically with occasional periods of rest. During such movements of the carriage, the beams move in unison toward and away from the plane of the spindles of the spinning frame at different stages in the carriage movement and the donning beam is swung to inverted position and then returned. The movement of the beams in unison toward and away from the plane of the spinning spindles is effected by means of positioning plates 209 attached to frames 79 (Figs. 3, 5, 9, and 10). Each positioning plate has a cam track 210 receiving the roller 127 on the lever 123 pivoted on the adjacent elevating truck and the track leads upwardly to an opening through plate 209, in which is mounted a switch plate 211 pivotally secured to a cover plate 212 attached to the outer face of plate 209. A spring 213 attached at one end to a stud on the cover plate and lying within a recess in the switch plate tends to swing the switch plate counterclockwise (Fig. 9). The form of the switch plate is such that, when a roller 127 starting at the bottom of track 210 moves upwardly along the track, it is guided around the outside of the switch plate to the left and, when it reaches the top of the opening containing the switch plate and starts back, the roller is guided along the right ride of the switch plate back to track 210.

As the elevating trucks 73 rise from their lowermost positions, rollers 127 following the inclined portions 210a of tracks 210 swing levers 123 to the rear and the levers, acting through the connections, cause the upper and lower positioning arms 115, 128 to swing and move the two beams away from the plane of the spinning frame spindles with a movement of translation. As the rollers 127 move along the vertical stretch 210b of the track, the beams move vertically and, when the rollers reach the inclined portions 210c of the tracks, the beams are moved inward toward the plane of the spinning spindles. The beams then have a vertical movement, until the carriage reaches the end of its upward movement. When the carriage starts down, the rollers have passed beyond the switch plates and, as the rollers move down along the rear sides of the switch plates, the beams are moved outward from the plane of the spinning spindles and then downward vertically until the rollers reach the inclined sections 210a, which cause the beams to move inward. During this movement of the beams, the donning beam is also given its arcuate movement.

The control mechanism

The operations of motor 83 for raising and lowering the carriage, motor 174 for swinging the donning beam, motor 175 for priming or initially setting the empty bobbin holding means and shears, and the motor 196 for releasing the empty bobbin holding means and operating the shears, are controlled by mechanism, which includes a control unit illustrated in Figs. 48-53, inc.

The control unit comprises a housing 214, in the upper part of which is mounted a solenoid 215 having a plunger 216, which is movable in a guide tube 217 and is connected to a crank arm 218 fast on a shaft 219 carrying a disc 220, having a spring-pressed pawl 221 projecting radially therefrom. Disc 220 lies within a gear 222 having internal ratchet teeth engageable by pawl 221 and meshes with an idler gear 223, which meshes with a gear 224 fast on a vertical shaft 225. Shaft 225 projects downwardly through the housing and carries a ratchet wheel 226 engageable by spring-pressed stop pawl 227.

The housing contains a plurality of switches arranged in two vertical rows and identified by the letters "F," "S," "R," and "C." The switches F1 and S1 control the starting and stopping, respectively, of priming motor 175. Switches F2, S2, and R2 control the starting, stopping, and reversing, respectively, of the carriage motor 83. Switches F3, S3, and R3 control the starting, stopping, and reversing, respectively, of the swinging motor 174. Switches F4, S4, and R4 control the starting, stopping, and reversing, respectively, of the releasing motor 196. Switch C controls the action of certain switches to be described.

Each of the switches has an operating plunger 228 engageable by a lever 229 pivoted on a post 230 adjacent the switch and having a roller 231 at its outer end. A pair of vertical posts 232, 233 are mounted within the housing to extend along the respective rows of switches, and a bell crank lever 234 is pivotally mounted on each rod adjacent each switch. Each bell crank lever has an arm 235 containing a screw 235a engageable with the roller 231 on the lever 229 for operating the plunger of the adjacent switch. The other arm 236 of the bell crank carries a roller 236a.

Shaft 225 carries a plurality of cams 237, one for each of the switches, and each cam comprises a hub 238 having an integral disc 239 with a circumferential flange 239a. A worm gear 240 is mounted fast on the hub of the cam at one side of disc 239 and, beyond the gear, a disc 241 is secured on the hub by a nut 242 threaded on the end of the hub. A trip tab 243 is mounted between the discs 239 and 241 on the hub with its end projecting outwardly beyond the cam. The tab is provided with a screw 244 meshing with the worm gear 240 and, by turning the screw, the circumferential position of the tab can be accurately adjusted. The tab is adapted to engage the wheel 236a of the bell crank lever 234 aligned with the cam.

There are eleven switches of the F, S, and R types in the housing of the control unit and eleven cams 237 on the shaft 225, the cams being identified in Fig. 53 by the symbols of the switches operated thereby. The cycle of operations of the machine includes twelve steps and, in each of these steps, a tab on at least one of the cams operates its related switch, while, in some steps, the tabs on two cams operate their switches. In order that the operation may be more clearly understood, the discs 239 of the cams shown in Fig. 53 have been marked with twelve subdivisions to indicate the positions of the tabs thereon. The switch C is operated by a cam 245 on shaft 225 and the cam has two high points, which hold switch C open during a number of steps in the cycle.

The wiring diagram (Fig. 54) shows three-phase power being supplied from lines 246 through the manually operated cut-off switch 247 to the magnetic contactor units A, B, C, D for controlling the motors 175, 83, 174, and 196, respectively. The units B, C, and D are of the reversing type, so that motors 83, 174, and 196 can be driven forwardly, stopped, and reversed, while unit A can be operated only to start and stop motor 175. The units are connected to respective switches of the F, S, and R series in the control unit and these switches are in parallel with a bank of push button switches, generally designated 248, for manual operation, when required. The solenoid 215 is supplied with current from a transformer 249 under the control of a push button switch PB and eleven station switches ST1-11, inc. Switches ST1-5, inc. and ST7-10, inc. are in parallel in one branch of the circuit with the secondary transformer 249 and solenoid 215. Switches ST6 and ST11 are in parallel in another branch of the circuit with the secondary of the transformer and the solenoid, and switch C is in series in that branch of the circuit with station switches ST6 and ST11. The push button switch PB is manually operated to start the cycle of operations of the apparatus and station switches ST1-ST11 inc. are disposed at different locations on the apparatus and are brought successively into action as parts of the apparatus move to different positions in successive steps in the cycle. Switches ST6 and ST11 are actuated by parts of the apparatus, which remain at rest for a considerable period after closing these switches and, in order to prevent a dead end in the cycle of operations, switch C is placed in series with switches ST6 and ST11 and is opened by cam 245 at the proper times.

Whenever a station switch is closed, solenoid 215 is energized and shaft 225 is advanced by one step. In that step, the trip tabs 243 on one or more of the cams 237 actuate the appropriate F, S, and R switches and one or more of the motors 83, 174, 175, and 196 are started, stopped, or reversed, as required.

The thread board

In the practice of the method of the invention, each yarn passing through a guide 66 to its traveler 68 is shifted to move its traveler rearwardly, that is, in a direction opposite to that of its normal travel, after the doffing coils have been spun on the lower end of the bobbin, to introduce a little slack in the yarns between their travelers and the delivery rolls. The thread guides must then be moved, so that they will not interfere with doffing. Accordingly, the spinning frame is provided with a thread board of novel construction, which can be operated to shift all of the guides laterally and also to move them out of the way of the full bobbin gripping jaws on the doffing beam.

The new thread board comprises a bar 250 of angle section mounted on a plurality of L-shaped levers 251, attached by links 252, 253 to supporting members 254. The members 254 are mounted on rods 255, 256 extending through brackets 254a attached to structural members of the spinning frame. The thread board disclosed is of the vertically reciprocating type and rods 255 are connected to reciprocating mechanism, while rods 256 are guide rods. In the operating position of the thread board, one flange of bar 250 is vertical and the other extends forward from the upper edge of the first.

A bar 257 of angle section is mounted in nested relation on bar 250 for lengthwise movement relative thereto and a plurality of plates 258, each carrying a pig-tail guide 66, are pivoted on the vertical flange of bar 257 and normally supported from beneath by respective brackets 259 attached to the flange. Each plate 258 has a tab 258a extending inwardly beyond its vertical mounting and the vertical flange of member 257 is formed with notches, one for the tab of each plate. The vertical flange of member 250 is also formed with notches, which lie beneath tabs 258a, when the plates are in position with their guides lying above respective spindles. When the plates are in this position, each plate can be swung upwardly to move its guide away from the top of the spindle.

A rack 260 is attached to the vertical flange of bar 250 adjacent one end and projects through a slot in the vertical flange of bar 257. A pinion 261 meshing with the rack is mounted on a shaft journaled in the horizontal flange of bar 257 and in a bracket 262 attached to the vertical flange of bar 257 above the slot. The shaft is provided with a pair of handles 263 attached to its upper end. By rotation of the handles, bar 257 can be moved endwise, so that the tabs 258a of the plates thereon are offset from the notches in the flange of bar 250. When the parts are in these positions, plates 258 are held firmly in position and cannot be swung on their pivots.

In the normal use of the thread board, the levers 251 lie as shown in Fig. 4 and in the dotted line positions in Fig. 32. The tabs 258a on plates 258 extend horizontally. The tabs 258a on plates 258 are aligned with notches in the upright flanges of both bars, so that the plates can be raised to swing the guides upwardly when necessary. In this position of the parts, the links 252, 253 extend toward the row of spindles and are inclined at low angles. When the doffing coils have been wound on the bobbins, the handles 263 are rotated to rotate pinion 261 and shift the bar 257 endwise, so that tabs 258a on plates 258 overlie solid portions of the top of the upright flange on bar 250 and the plates are locked against swinging movement. The handles 263 are then pushed rearwardly and this causes the levers 251 to swing on the links 252, 253 to the full line positions shown in Fig. 32. In the swinging of levers 251, the plates 258 and their guides 66 are swung inwardly and then down behind the full bobbins on the spindles to the positions shown in Fig. 32. The initial endwise shift of the bar 257 is in such direction that each traveler 68 is moved rearwardly and to one side of its ring 69. Thereafter, when the full bobbins are doffed, the yarns Y between the bobbins and doffing coils lie in position to be cut by the shears on the donning beam.

The steps in the method and the cycle of operations of the apparatus

During spinning, the carriage is in its lower position with the beams stored, as shown in Fig. 37. In this position, the doffing beam 84 lies inwardly, with the full bobbin gripping jaws 97 of each pair between the upper and lower flanges on the spindle rail 61 and on opposite sides of respective spindle bolsters 62. The thread guides 66 lie above respective spindles and may be reciprocated vertically or not, depending on the construction of the spinning frame. The ring rail 70 reciprocates vertically in the usual way to build the packages on the bobbins on the spindles.

When the bobbins are full and doffing is required (Fig. 37), the ring rail 70 is lowered to the lower end of the bobbins and the frame operated to spin a few doffing coils on the lower end of each bobbin. The bar 257 of the thread board is then shifted endwise to lock the plates 258 in position and the thread board is swung to place it to the rear of the full bobbins and with the plates 258 and guides 66 extending downwardly (Fig. 38).

In order to initiate the first step of the cycle of operation of the apparatus, the push button switch PB is momentarily closed to energize solenoid 215. This causes shaft 225 to be advanced one step and, in that movement of the shaft, the tab 243 on cam F1 operates to close the corresponding switch F1. This starts the priming motor 175 and it rotates the shaft 178 to move gear segment 187 clockwise. Previously, empty bobbins have been inserted in inverted position in the empty bobbin units of the donning rail between the holding jaws 146 and, when lever 163 is rocked by gear segment 187, the bar 160 is moved to the left (Fig. 18) and this causes bar 156 to move upwardly carrying with it slides 150. The upward movement of the slides causes the shears 147 to be projected upwardly and the holding jaws 146 of each bar to be moved toward each other to grip the empty bobbin. As the priming unit operates, it trips station switch ST1 (Fig. 1) and this energizes the solenoid and shaft 225 is advanced by one step.

In the second step of the cycle, tabs on cams S1 and F2 operate their respective switches to stop the priming motor 175 and start the carriage motor 83 forwardly. Motor 83, accordingly, drives screws 76 in such direction as to raise the carriage and, as the carriage moves upward, the levers 123 are swung by cam track 210, so that the beams move outwardly, upwardly, and then inwardly along the dotted line path shown in Fig. 39. This translational movement of the beams permits the full bobbin gripping jaws 97 to pass beyond the upper flange of the spindle rail and the ring rail and, when the beams have moved inwardly, the jaws of each pair lie on opposite sides of respective full bobbins. When the beams reach the limit of their inward movement, they trip station switch ST2 (Fig. 39) and this advances shaft 225 through its third step.

In the third step of the cycle, tabs on cams S2 and F3 operate their respective switches to stop the carriage motor 83 and start the swinging motor 174 in the forward direction. This operation of motor 174 causes the donning beam 85 to swing outward from the doffing beam and, when the donning beam has swung free of rollers 107 on levers 106 on the doffing beam, the springs 109 on the beam operate to move the actuating bar 103 downwardly and the full bobbin gripping jaws are caused to engage the bobbins. When the donning beam has moved outwardly through an arc of approximately 45°, it trips station switch ST3 (Fig. 40) to advance shaft 225 through the fourth step.

In the fourth step of the cycle, a tab on cam S3 actuates its switch to stop the swinging motor 174 and a tab on cam F2 operates its switch to start the carriage motor 83 in the forward direction. The carriage is then moved vertically with the doffing beam carrying with it the full bobbins, until they are free of the spindles, after which levers 123 are swung by cam track 210 to cause the beams to move outwardly to the position shown in Fig. 41. As the full bobbins are raised by the carriage, the doffing coils wound on the lower end of each bobbin are pulled off the bobbin and are wrapped about the spindles 63, from which the bobbins were removed, as shown in Fig. 31. When the beams have reached the upward limit of their travel with the carriage, one of the beams trips station switch ST4 to energize the solenoid and cause it to advance shaft 225 through the fifth step.

In the fifth step, a tab on cam S2 operates its switch to stop the carriage motor 83 and a tab on cam R2 operates its switch to start the carriage motor 83 in the reverse direction to lower the carriage. Also a tab on cam F3 operates its switch to start the swinging motor 174 in the forward direction. When the donning beam has completed its arcuate movement and lies inverted with its empty bobbins in registry with the spindles, it trips station switch ST5 (Fig. 42) and the solenoid is energized and shaft 225 advanced through the sixth step.

In the sixth step, a tab on switch S3 operates its switch to stop the swinging motor 174. The carriage motor continues in operation, however, and the beams move downwardly until the donning beam dons the empty bobbins on the spindles. As the donning is being completed, the donning beam actuates station switch ST6 (Fig. 1) to energize the solenoid and advance shaft 225 through its seventh step.

In the seventh step, a tab on cam S2 actuates its switch to stop the carriage motor 83 and the beams come to rest (Fig. 43). Also a tab on cam F4 operates its switch to start motor 196 in the forward direction and the motor operates the releasing unit to swing lever 164 counterclockwise (Fig. 28). This causes the actuating bar 160 on the donning beam to move to the right (Fig. 18) and to draw slides 150 downwardly. As a result, the empty bobbin holding jaws 146 are opened and the shearing blades 147 move into their respective empty bobbin units and, at the same time, cut the yarns between the doffed full bobbins and the doffing coils on the respective spindles.

As the arm 197 of the release unit reaches the end of its movement with lever 188 to swing arm 164 counterclockwise (Fig. 28), arm 197 trips station switch ST7 and the solenoid is energized to advance shaft 225 through the eighth step.

In the eighth step of the cycle, tabs on cams S4 and R4 operate their respective switches to stop motor 196 and start it in a rearward direction. This restores arm 188 of the release unit to its initial position and, as the arm reaches that position, it trips switch ST8, energizing the solenoid to advance shaft 225 through its ninth step.

In the ninth step of the cycle, a tab on cam S4 operates its switch to stop motor 196 and a tab on switch R3 operates its switch to start swinging motor 174 rearwardly to swing the donning beam back toward its initial position against the outer face of the doffing beam (Fig. 44). When the donning beam reaches this position, it trips switch ST9 energizing the solenoid to advance shaft 225 for the tenth step.

In the tenth step, a tab on cam S3 stops the swinging motor 174 and the donning beam is now in its initial position. As the donning beam is swinging toward that position, it engages arms 106 on the doffing beam and gradually swings the arms to raise actuating bar 103 against springs 109. By the time the donning beam has reached its inmost position, bar 103 has been moved to open the full bobbin gripping jaws to release the full bobbins and they drop down on the spindles 198 on the angle iron 199 of the full bobbin receiver. The weight of the full bobbins causes arms 201 to swing downwardly against the action of weights 205 and, as rollers 206 on angle iron 199 engage guide surfaces 207, the angle iron is swung to cause its spindles to point forwardly (Fig. 45). When the angle iron reaches the lower limit of its forward movement, it trips station switch ST10 and shaft 225 is advanced by the solenoid through the eleventh step.

In the eleventh step, a tab on cam R2 starts the carriage motor 83 in the reverse direction to lower the carriage and, during such movement, the beams are first moved vertically downward and, then near the end of their downward travel, are moved inwardly to stored position. When the beams reach this position, one of the beams engages switch ST11 (Fig. 46) and the solenoid is energized to advance shaft 225 through the twelfth and final step in its movement.

In the twelfth step of the cycle, a tab on cam S2 operates its switch to stop the carriage motor 83 and the cycle is thus completed. The thread board is then shifted upwardly to the dotted line position in Fig. 32 and bar 257 is shifted endwise to bring the plates 258 in alignment with respective spindles with their guides 66 above the tops of the spindles. The frame is now ready for spinning and the ring rail is released and moved up to operative position, as the spindles 63 accelerate to operating speed. During the spinning operation, the full bobbins are removed from spindles 198 of the full bobbin receiver and empty bobbins are inserted between the holding jaws on the donning beam.

The wiring diagram includes the push-button switch PB, eleven station switches ST1–ST11, incl., and switch C, which is in series in a branch circuit through solenoid 215 with station switches ST6 and ST11. In actual practice, it is not necessary to provide eleven station switches, since a number of these switches can be placed in such positions that they can be operated to initiate more than one step in the cycle. The purpose of employing switch C is to avoid a dead end in the cycle following the closing of station switch ST6 or ST11, these switches being closed by parts, which remain in position for a considerable period after actuation of the switches.

Switch C is actuated by cam 245 on shaft 225 and the shape of the cam is such that the switch is open during the first and second steps of the cycle and is actuated to close during the third step. Switch C remains closed during the fourth, fifth, and sixth steps, is actuated to open during the seventh step, and remains open during the eighth and ninth steps. In the tenth step, switch C is actuated to close, remains closed during the eleventh step, and is actuated to open during the twelfth step.

In the sixth step of the cycle, the carriage motor 83 is in operation and the beams move downwardly until the donning beam dons the empty bobbins on the spindles. As the donning is completed, the donning beam actuates switch ST11 to energize solenoid 215 and advance shaft 225 through the seventh step. In the seventh step, the carriage motor 83 is stopped, and the beams come to rest and remain at rest through the eighth and ninth steps of the cycle. With the closing of switch ST6, solenoid 215 is energized and thereafter must be de-energized in order that, upon its next energization, it will advance shaft 225 for the next step. Accordingly, while switch ST6 is being held closed in the seventh step by the donning beam at rest, switch C is opened by cam 245 and this opens the branch circuit through solenoid 215.

In the eleventh step of the cycle, the carriage moves to its starting position and, during such movement, the beams move to their stored positions. When the beams reach these positions, one of the beams actuates switch ST11 to close the branch circuit through the solenoid, so that the solenoid will be energized and advance shaft 225 through the final step in its movement. In order that the closing of switch ST11 will cause energization of the solenoid, switch C is actuated to close in the tenth step of the cycle and remains closed during the eleventh step. When the beams have reached stored positions, they continue to hold switch ST11 closed and, in order to de-energize the solenoid, cam 245 opens switch C during the twelfth step of the cycle.

The twelve steps in the cycle of operations of the apparatus are carried out in rapid succession and a total interval of 55 seconds elapses from the time the push button switch PB is pressed to start the cycle of operations to the time when the carriage is back with the beams in stored position. Since the doffer is required only to lower the ring rail, to spin the doffing coils, and to operate the thread board to put it out of the way and then restore it to operating position, the donning and doffing operations can be performed by a doffer of little experience and little manual dexterity. The apparatus operates on all the spindles of a single side of a spinning frame and, during spinning, ample time is afforded for removing the full bobbins and loading the empty bobbin units of the donning beam with empty bobbins.

I claim:

1. A method of doffing a textile machine having a plurality of vertical spindles, a ring rail having a ring encircling each spindle, and a traveler on each ring, through which a yarn passes to the bobbin on the spindle, which comprises lowering the ring rail to the lower ends of the bobbins, winding doffing coils of yarn on the lower ends of the bobbins, shifting each yarn to move its traveler rearwardly and to one side of its ring, simultaneously raising all the bobbins free of the spindles and then moving them forwardly from the spindles, the doffing coils slipping off the bobbins, as the bobbins are raised, and becoming wrapped about the spindles, and simultaneously cutting all the yarns between their full bobbins and their doffing coils.

2. A method of doffing and donning a textile machine having a plurality of vertical spindles, a ring rail having a ring encircling each spindle, and a traveler on each ring, through which a yarn passes to the bobbin on the spindle, which comprises lowering the ring rail to the lower ends of the bobbins, winding doffing coils of yarn on the lower ends of the bobbins, shifting each yarn to move its traveler rearwardly and to one side of its ring, simultaneously raising all the full bobbins free of the spindles and then moving them forwardly from the spindles, the doffing coils slipping off the bobbins, as the bobbins are raised, and becoming wrapped about the spindles, holding empty bobbins vertically above respective spindles, lowering the empty bobbins to don them on the spindles and clamp the doffing coils, and simultaneously releasing all the donned empty bobbins and cutting all the yarns between the full bobbins and the doffing coils.

3. An apparatus for doffing and donning the bobbins of a textile machine having a row of vertical spindles for supporting bobbins during the winding of yarn thereon, which comprises a carriage mounted for reciprocating movement in a vertical plane in front of the frame and including a doffing beam and a donning beam mounted for translational movement in unison toward and away from the spindles, the donning beam normally lying in front of the doffing beam and being rotatable about a horizontal axis, a plurality of means on the doffing beam for gripping full bobbins, a plurality of means on the donning beam for holding empty bobbins, a plurality of shears on the carriage for cutting yarns between the spindles and the full bobbins doffed therefrom, means for reciprocating the carriage, and means operating automatically during the reciprocations of the carriage to cause the beams, the gripping and holding means, and the shears to perform a cycle of operations, in which the doffing beam grips the full bobbins on the spindles, doffs the bobbins, and moves them forwardly from the spindles, the donning beam swings to the rear of the doffing beam to align empty bobbins with the spindles, dons the empty bobbins, and releases them, the shears cut the yarns between their spindles, and the full bobbins doffed therefrom, the donning beam swings to its initial position in front of the doffing beam, and the doffing beam releases the full bobbins.

4. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of said beam, a plurality of means on the donning beam for holding empty bobbins, a plurality of yarn shears on the carriage, means for reciprocating the carriage along the guides, a stationary cam track extending along the path of the carriage, means connected to the beams and engaging the track for imparting to the beams translational movements determined by the shape of the track, means on the carriage for moving the donning beam angularly, means for operating the gripping means in unison, means for operating the holding means in unison, and means for operating the shears in unison.

5. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of said beam, a plurality of means on the donning beam for holding empty bobbins, a plurality of yarn shears on the donning beam, means for reciprocating the carriage along the guides, a stationary cam track extending along the path of the carriage, a member on the carriage connected to the beams and engaging the track, the member being operated by the track to impart translational movement to the beams, means on the carriage for moving the donning beam angularly, means on the carriage for operating the gripping means in unison, and means for operating the holding means in unison and the shears in unison.

6. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of said beam, a plurality of means on the donning beam for holding empty bobbins, a plurality of yarn shears on the carriage, means for reciprocating the carriage along the guides, a stationary cam track extending along the path of the carriage, means connected to the beams and engaging the track for imparting to the beams translational movements determined by the shape of the track, means on the carriage for moving the donning beam angularly, means for operating the gripping means in unison, and means spaced along the path of travel of the carriage for closing the holding means and opening the shears and for opening the holding means and closing the shears, respectively.

7. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of said beam, a plurality of means on the donning beam for holding empty bobbins, a plurality of yarn shears on the carriage, means for reciprocating the carriage along the guides, a stationary cam track extending along the path of the carriage, means connected to the beams and engaging the track for imparting to the beams translational movements determined by the shape of the track, a motor on the carriage connected to the donning beam and operable to move it angularly, means on the doffing beam connected to the gripping means and operable to actuate them in unison, and means on the carriage operable to actuate the holding means in unison and the shears in unison.

8. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of said beam, a plurality of means on the donning beam for holding empty bobbins, a plurality of yarn shears on the carriage, means for reciprocating the carriage along the guides, a stationary cam track extending along the path of the carriage, means connected to the beams and engaging the track for imparting to the beams translational movements determined by the shape of the track, a motor on the carriage connected to the donning beam and operable to move it angularly, means on the doffing beam connected to the gripping means and operable to cause them to function in unison, means on the carriage operable to actuate the holding means in unison and the shears in unison, and means spaced along the path of travel of the carriage for causing the actuating means to close the holding means and open the shears and to open the holding means and close the shears, respectively.

9. In apparatus for doffing and donning the cores of a textile machine having a row of vertical spindles for supporting bobbins during the winding of yarn thereon, the combination of a carriage having trucks at its ends, vertical guides in which the trucks are movable, a pair of upper and lower positioning levers pivoted on each track, a chassis frame carried by an upper and lower lever on each truck, a doffing beam attached at its ends to the chassis frames, the beam carrying a plurality of means for gripping full bobbins, a donning beam pivotally attached to the upper and lower positioning levers at its opposite ends, the donning beam carrying a plurality of means for holding empty bobbins, means on the carriage connected to the upper and lower positioning levers of a pair and operable to rock them to impart translational movement to the beams and frames, means carried by the frames for imparting angular movement to the donning beam, stationary means extending along the guides for operating the rocking means, means for reciprocating the carriage, means for actuating the gripping means in unison, and means for actuating the holding means in unison.

10. In apparatus for doffing and donning the cores of a textile machine having a row of vertical spindles for supporting bobbins during the winding of yarn thereon, the combination of a carriage having trucks at its ends, vertical guides in which the trucks are movable, a pair of upper and lower positioning levers pivoted on each truck, a chassis frame carried by an upper and lower lever on each truck, a doffing beam attached at its ends to the chassis frames, the beam carrying a plurality of means for gripping full bobbins, a donning beam pivotally attached to the chassis frames at its opposite ends, the donning beam carrying a plurality of means for holding empty bobbins, means on the carriage connected to the upper and lower positioning levers of a pair and operable to rock them to impart translational movement to the beams and frames, means carried by the frames for imparting angular movement to the donning beam, stationary means extending along the guides for operating the rocking means, means for reciprocating the carriage, means for actuating the gripping means in unison, and means for actuating the holding means in unison.

11. In apparatus for doffing and donning the cores of a textile machine having a row of vertical spindles for supporting bobbins during the winding of yarn thereon, the combination of a carriage having trucks at its ends, vertical guides in which the trucks are movable, a pair of upper and lower positioning levers pivoted on each truck, a chassis frame carried by an upper and lower lever on each truck, a doffing beam attached at its ends to the chassis frames, the beam carrying a plurality of means for gripping full bobbins, a donning beam pivotally attached to the upper and lower positioning levers at its opposite ends, the donning beam carrying a plurality of means for holding empty bobbins, means on the carriage connected to the upper and lower positioning levers of a pair and operable to rock them to impart translational movement to the beams and frames, means carried by the frames for imparting angular movement to the donning beam, said means including a reversible motor, stationary means extending along the guides for operating the rocking means, means for reciprocating the carriage, means for actuating the gripping means in unison, and means for actuating the holding means in unison.

12. In an apparatus for doffing and donning the bobbins of a textile machine having a row of vertical spindles for supporting bobbins during the winding of yarn thereon, the combination of a carriage, vertical guides along which the carriage is movable, a doffing beam mounted on the carriage for translational movement and provided with a plurality of means for gripping full bobbins, a donning beam mounted on the carriage for translational movement with the doffing beam and also for angular movement on an axis lengthwise of and offset rearwardly from said beam, a plurality of means on the donning beam for holding empty bobbins, means for reciprocating the carriage along the guides, means along the guides for effecting translational movement of the beams in unison, means on the carriage for moving the donning beam angularly about said axis to place it in inverted position behind the doffing beam, means for operating the gripping means in unison, and means for operating the holding means in unison.

13. In an apparatus for doffing the full bobbins of a textile machine having a row of vertical spindles for supporting bobbins during the winding of yarn thereon, the combination of a doffing beam comprising a supporting structure formed with a plurality of cells in a row lengthwise of the structure and open at one side of the structure, a demountable gripping unit in each cell, each unit including a frame, a pair of jaws mounted in the frame for movement toward and away from each other, means urging the jaws toward each other, and means connecting the jaws for movement in unison, an actuating bar extending along the row of units and engaging the connecting means, means for moving the bar to move the jaws, and means for moving the beam and operating the bar moving means to cause the jaws to grip full bobbins on the spindles, to raise the beam to doff the bobbins, to move the beam forwardly from the spindles, to open the jaws to release bobbins, and to return the beam to its initial position.

14. In a donning apparatus for placing empty bobbins on vertical spindles over doffing coils of yarn left after doffing of full bobbins from said spindles, the combination of, a beam comprising a supporting structure, a pluarlity of pairs of jaws mounted on the structure in a lengthwise row, the jaws of each pair being movable toward and away from each other to close and open the jaws, a pair of shears mounted on the structure adjacent each pair of jaws, a plurality of members movable in one direction to close respective pairs of jaws and open the related pairs of shears and in the opposite direction to open respective pairs of jaws and close the related pairs of shears, means for moving the members in unison, and means for moving the beam and operating the member moving means to move the beam to a position above the spindles, to lower the beam to place empty bobbins carried by the pairs of jaws upon the spindles over doffing coils thereon, to open the jaws to release the bobbins and to close the pairs of shears to cut the yarns leading from respective doffing coils, and to move the beam to a position remote from the spindles.

15. In a donning apparatus for placing empty bobbins on vertical spindles over doffing coils of yarn left after doffing of full bobbins from said spindles, the combination of, a beam comprising a supporting structure formed with a plurality of cells in a row lengthwise of the structure and open at one side of the structure, a demountable unit in each cell, each unit including a housing, a pair of jaws mounted within the housing for movement toward and away from each other, a pair of shears mounted within the housing, and means for operating the jaws and shears in unison, an actuating bar connected to the operating means and movable to actuate them in unison, and means for moving the beam and operating the bar to move the beam to a position above the spindles, to lower the beam to place empty bobbins carried by the pairs of jaws upon the spindles over doffing coils thereon, to open the jaws to release the bobbins and to close the pairs of shears to cut the yarns leading from respective doffing coils, and to move the beam to a position remote from the spindles.

16. In an apparatus for doffing and donning the bobbins of a textile machine having a row of vertical spindles for supporting bobbins during the winding of yarn thereon, the combination of a carriage, which comprises a pair of trucks, an upper and a lower positioning lever mounted on each truck on parallel pivots, a doffing beam supported at its end by the pairs of levers on the trucks, the beam carrying means for gripping full bobbins, a donning beam attached to the doffing beam at opposite ends thereof for swinging movement on an axis extending lengthwise of the beams, the donning beam carrying means for holding empty bobbins, means on the carriage for swinging the donning beam, means at each end of the carriage connected to the positioning levers and operable to swing the levers and impart translational movement to the beams, means for reciprocating the carriage, and means functioning during reciprocation of the carriage to operate the means for swinging the donning beam, the means for swinging the levers, the bobbin gripping means, and the bobbin holding means in a cycle, during which the bobbin gripping means grip full bobbins on the spindles, the beams are caused to rise to doff the full bobbins and are then moved forwardly of the spindles, the donning beam is swung to the rear of the doffing beam to align empty bobbins held by the bobbin holding means with the spindles, the beams are lowered to don the empty bobbins on the spindles and the holding means are actuated to release the empty bobbins, the bobbin gripping means are released to discharge the full bobbins, the donning beam is swung to a position forwardly of the doffing beam, and the beams are moved to place the bobbin gripping means in a position to grip full bobbins on the spindles.

17. In an apparatus for doffing full bobbins from the spindles of a textile machine, the combination of a doffing beam, a plurality of means on the beam for gripping full bobbins and holding them in upright position, a rail having a plurality of spindles arranged to enter full bobbins released from the gripping means, a plurality of pivoted arms, on which the rail is pivoted, the arms being weighted to swing the arms and rail with empty spindles to one position, guide means operable to swing the rail on its pivots, when the arms are swung from their initial positions by the weight of full bobbins on the spindles, and means for operating the doffing beam and the bobbin gripping means in a cycle, in which the bobbin gripping means grip full bobbins on the machine spindles, the beam is raised to doff the bobbins from the machine spindles and moved to place the bobbins in alignment with the rail spindles, and the gripping means are operated to release the bobbins.

References Cited in the file of this patent

UNITED STATES PATENTS

| | | |
|---|---|---|
| 1,384,449 | Graf | July 12, 1921 |
| 1,463,479 | Miller | July 31, 1923 |
| 1,579,257 | Stell et al. | Apr. 6, 1926 |
| 1,608,912 | Smith et al. | Nov. 30, 1926 |
| 1,771,923 | Hendrickson et al. | July 29, 1930 |
| 1,810,754 | Buddecke | June 16, 1931 |
| 2,148,474 | Wyman | Feb. 28, 1939 |
| 2,413,172 | Cotchett | Dec. 24, 1946 |
| 2,541,299 | Shannon | Feb. 13, 1951 |
| 2,564,280 | Rigg | Aug. 14, 1951 |
| 2,582,696 | Haythornthwaite | Jan. 15, 1952 |

FOREIGN PATENTS

| | | |
|---|---|---|
| 628,418 | Great Britain | Aug. 29, 1949 |